US009510396B2

(12) United States Patent
Okajima

(10) Patent No.: US 9,510,396 B2
(45) Date of Patent: Nov. 29, 2016

(54) HIGH-FREQUENCY HEATING DEVICE

(71) Applicant: Panasonic Intellectual Property Management Co., Ltd., Osaka-shi, Osaka (JP)

(72) Inventor: Toshiyuki Okajima, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 167 days.

(21) Appl. No.: 14/406,058

(22) PCT Filed: Feb. 28, 2013

(86) PCT No.: PCT/JP2013/001231
§ 371 (c)(1),
(2) Date: Dec. 5, 2014

(87) PCT Pub. No.: WO2013/183200
PCT Pub. Date: Dec. 12, 2013

(65) Prior Publication Data
US 2015/0156823 A1 Jun. 4, 2015

(30) Foreign Application Priority Data

Jun. 7, 2012 (JP) .................................. 2012-129556

(51) Int. Cl.
*H05B 6/06* (2006.01)
*H05B 6/64* (2006.01)
(Continued)

(52) U.S. Cl.
CPC ............... *H05B 6/06* (2013.01); *H05B 6/686* (2013.01); *H05B 6/70* (2013.01); *H05B 6/705* (2013.01); *Y02B 40/143* (2013.01); *Y02B 40/146* (2013.01)

(58) Field of Classification Search
CPC ............ H05B 6/686; H05B 6/06; H05B 6/70; H05B 6/705; Y02B 40/143; Y02B 40/146
(Continued)

(56) References Cited

U.S. PATENT DOCUMENTS

2006/0232471 A1   10/2006  Coumou
2009/0236335 A1\*  9/2009  Ben-Shmuel ........ H05B 6/6402
219/710

(Continued)

FOREIGN PATENT DOCUMENTS

CN        102187734 A    9/2011
JP         60-193292 A   10/1985
(Continued)

OTHER PUBLICATIONS

Office Action, and English language translation thereof, in corresponding Chinese Application No. 201380029927.1, dated Oct. 10, 2015, 8 pages.

(Continued)

*Primary Examiner* — Quang Van
(74) *Attorney, Agent, or Firm* — Brinks Gilson & Lione

(57) ABSTRACT

A high-frequency heating device of the present invention includes at least one high-frequency power generating part, at least one high-frequency power unit including a quadrature modulation part and a high-frequency power amplification part, a radiation part, a modulation signal generating part, and a control part, and the control part supplies the modulation signal generating part with a plurality of pieces of subcarrier information respectively including pieces of information of offset frequencies and phases, generates an in-phase modulation signal and a quadrature modulation signal, performs quadrature modulation in the quadrature modulation part, and outputs a plurality of subcarrier waves.

24 Claims, 18 Drawing Sheets

(51) Int. Cl.
*H05B 6/68* (2006.01)
*H05B 6/70* (2006.01)

(58) Field of Classification Search
USPC ............ 331/177 R; 219/702, 704, 709, 713,
219/715, 718, 721, 722, 723, 745, 746, 748,
219/750, 760, 761, 770, 778, 779;
118/723 R, 723 MW, 723 AN, 723 E,
118/723 I, 715; 156/345.41, 345.29, 345.1;
427/248.1, 341.575
See application file for complete search history.

(56) References Cited

U.S. PATENT DOCUMENTS

| 2011/0168695 | A1 | 7/2011 | Okajima et al. | |
|---|---|---|---|---|
| 2011/0204043 | A1 | 8/2011 | Ishizaki | |
| 2012/0067873 | A1* | 3/2012 | Mihara | H05B 6/686 219/704 |
| 2012/0103972 | A1 | 5/2012 | Okajima | |
| 2012/0103975 | A1* | 5/2012 | Okajima | H05B 6/6447 219/660 |
| 2015/0351164 | A1* | 12/2015 | Wesson | H05B 6/686 219/756 |

FOREIGN PATENT DOCUMENTS

| JP | 2009-301747 A | 12/2009 |
|---|---|---|
| JP | 2010-4453 A | 1/2010 |
| JP | 2010-92795 A | 4/2010 |
| WO | WO 2010/140342 A1 | 12/2010 |
| WO | WO 2012/001523 A2 | 1/2012 |
| WO | WO 2012/001523 A3 | 1/2012 |

OTHER PUBLICATIONS

International Search Report, and English language translation thereof, in corresponding International Application No. PCT/JP2013/001231, dated Apr. 9, 2013, 3 pages.

Extended European Search Report in corresponding European Application No. 13800015.3, dated May 22, 2015, 7 pages.

International Preliminary Report on Patentability, and English language translation thereof, in corresponding International Application No. PCT/JP2013/001231, dated Dec. 18, 2014, 11 pages.

* cited by examiner

MICROWAVE DISTRIBUTION WHEN FREQUENCIES=fA, fB, fC ARE RADIATED AT SAME TIME

HIGH-FREQUENCY HEATING DEVICE

This application is a 371 application of PCT/JP2013/001231 having an international filing date of Feb. 28, 2013, which claims priority to JP 2012-129556 filed Jun. 7, 2012, the entire contents of which are incorporated herein by reference.

TECHNICAL FIELD

The present invention relates to a high-frequency heating device dielectrically heating an object to be heated housed in a heating chamber.

BACKGROUND ART

For a high-frequency heating device conducting a heating treatment of an object to be heated such as a food with high-frequency power, various techniques are conventionally disclosed for local heating depending on a state and a shape of the object to be heated and for stirring radiation of high-frequency power into a heating chamber before applying the radiation to an object to be heated, for the purpose of improvement in heating efficiency and uniform heating without unevenness of heating.

For example, Japanese Laid-Open Patent Publication No. 2010-92795 (Patent Document 1) discloses a technique of operating a microwave distribution by phase difference control between power supplying parts arranged substantially symmetrically on a bottom wall surface of a heating chamber. This technique achieves heating with high efficiency by suppressing a reflected power to the minimum for various objects to be heated through optimum control of a phase difference and an oscillating frequency of microwaves.

Japanese Laid-Open Patent Publication No. 60-193292 (Patent Document 2) discloses a technique of controlling output of a microwave oven by disposing respective independent microwave power supply devices for antennas arranged in the microwave oven and selectively operating the microwave power supply devices. This technique improves uniform heating of an object to be heated through excitation at a plurality of frequencies by the same microwave oven.

CITATION LIST

Patent Literature

PLT 1: Japanese Laid-Open Patent Publication No. 2010-92795
PLT 2: Japanese Laid-Open Patent Publication No. 60-193292

SUMMARY OF THE INVENTION

Technical Problem

As described above, the configuration disclosed in Patent Document 1 optimally controls a phase difference and a frequency of microwaves such that a reflected power is minimized. Therefore, the configuration disclosed in Patent Document 1 is effective for an object to be heated with significant thermal diffusion due to convection such as water and coffee; however, uneven heating is likely to occur in an object to be heated with a slow thermal diffusion rate such as foodstuffs and solid foods. Although a plurality of microwave distributions can be formed at the same time by combining pluralities of frequencies and phase differences, at least one oscillator and two antennas are required for one microwave distribution. Therefore, the number of microwave distributions formed at the same time is limited by the numbers of the oscillators and the antennas, and an increase in size of a device is inevitable for increasing the number of microwave distributions formed at the same time in this configuration.

As described above, the configuration disclosed in Patent Document 2 is provided with respective independent microwave power supply devices for antennas arranged in the microwave oven to selectively operate the microwave power supply devices. Therefore, in the configuration disclosed in Patent Document 2, the number of microwave distributions formed at the same time is limited by the numbers of the antennas and the microwave power supply devices, and an increase in size of a device is inevitable for increasing the number of microwave distributions formed at the same time in this configuration.

The present invention solves the problems in the conventional configurations and it is an object of the present invention to provide a high-frequency heating device capable of forming a plurality of microwave distributions at the same time without increasing the numbers of oscillators and antennas.

Solution to Problem

In order to solve the above-mentioned problems in the conventional configurations, a high-frequency heating device of the present invention heats an object to be heated housed in a heating chamber wherein the high-frequency heating device comprises:

at least one high-frequency power generating part generating a high-frequency power of a set frequency;

at least one high-frequency power unit including a quadrature modulation part modulating a high-frequency power generated by the high-frequency power generating part with an input modulation signal, and a high-frequency power amplification part amplifying a high-frequency power modulated by the quadrature modulation part to an amplitude of power suitable for heating;

at least one radiation part radiating a high-frequency power output from the high-frequency power unit to the object to be heated;

a modulation signal generating part generating a modulation signal supplied to the quadrature modulation part based on input information of pluralities of frequencies and phases; and a control part setting a reference frequency of a high-frequency power radiated from the radiation part in the high-frequency power generating part, the control part outputting information of individual frequencies and phases of a plurality of high-frequency powers radiated from the radiation part to the modulation signal generating part, the control part supplying the modulation signal generating part with a plurality of pieces of subcarrier information respectively including pieces of information of offset frequencies and phases relative to the reference frequency for a plurality of high-frequency powers radiated from the radiation part, the modulation signal generating part generating an in-phase modulation signal and a quadrature modulation signal based on the plurality of pieces of subcarrier information supplied from the control part, the modulation signal generating part outputting the in-phase modulation signal and the quadrature modulation signal to the quadrature modulation part, the quadrature modulation part performing quadrature modulation of a high-frequency power input from the high-frequency power generating part with the in-phase modulation signal and the quadrature modulation signal input from the modulation signal generating part, the quadrature modulation part outputting a plurality of subcarrier waves of the offset frequencies and the phases relative to the reference frequency.

With this configuration, the high-frequency heating device of the present invention can generate high-frequency powers at pluralities of frequencies and phases for output of one high-frequency power from the high-frequency power generating part to radiate the plurality of the high-frequency powers from the same radiation part at the same time to an object to be heated and therefore can form a plurality of microwave distributions at the same time without increasing the numbers of the oscillators and the radiation parts and can implement the uniform heating and various types of heating control with a small size at low cost.

Herein, the modulation signal generating part generates the in-phase modulation signal and the quadrature modulation signal by an inverse fast Fourier transform (IFFT) arithmetic process for the plurality of pieces of subcarrier information supplied from the control part and may supply the in-phase modulation signal and the quadrature modulation signal to the modulation signal generating part.

With this configuration, the high-frequency heating device of the present invention can control frequencies and phases of a plurality of subcarrier waves radiated from the radiation part with a simple configuration at high speed.

Herein, the control part further has a subcarrier information storage part storing a plurality of predefined pieces of the subcarrier information, takes out a plurality of suitable pieces of the subcarrier information from the subcarrier information storage part when performing the heating, sets the reference frequency in the high-frequency power generating part, and may output the subcarrier information to the modulation signal generating part.

With this configuration, the high-frequency heating device of the present invention can more appropriately control frequencies and phases of a plurality of subcarrier waves radiated from the radiation part so as to perform the heating desired by a user with a simple configuration at high speed.

Herein, the control part determines the reference frequency such that a maximum value of absolute values of the offset frequencies relative to the reference frequency is minimized in the plurality of the subcarrier waves, and may set the frequency in the high-frequency power generating part.

With this configuration, the high-frequency heating device of the present invention can narrow a band of an in-phase modulation signal and a quadrature modulation signal supplied to the quadrature modulation part to reduce the loads of a generating circuit of a modulation signal and a modulation signal transmission circuit and therefore can implement the circuits with a small size at low cost.

Herein, the high-frequency power unit further includes a power detection unit, wherein the power detection unit detects an output power sent out from the high-frequency power amplification part to the radiation part and/or a backflow power flowing back from the radiation part to the high-frequency power amplification part, and wherein the control unit may determine the subcarrier information supplied to the modulation signal generating part and the reference frequency set in the high-frequency power generating part by using detection information of the output power and/or the backflow power detected by the power detection unit.

With this configuration, the high-frequency heating device of the present invention detects the power sent out to the radiation part or the power flowing back from the radiation part to determine the frequency and the phase used for heating based on these pieces of the detected information and therefore can form a plurality of microwave distributions at the same time and achieve heating with high efficiency.

Herein, the power detection part has a quadrature detection part, wherein the quadrature detection part detects an in-phase detection signal and a quadrature detection signal for demodulating the output power or the backflow power by performing quadrature detection of the output power or the backflow power by using the high-frequency power generated by the high-frequency power generating part, wherein the control part further has a demodulation part, wherein the demodulation part acquires offset frequency and phase information of individual subcarriers by applying a fast Fourier transform (FFT) arithmetic process to the in-phase detection signal and the quadrature detection signal detected by the quadrature detection part, and wherein the control part determines the subcarrier information supplied to the modulation signal generating part and the reference frequency set in the high-frequency power generating part by using the offset frequency and phase information of individual subcarriers acquired by the demodulation part.

With this configuration, the high-frequency heating device of the present invention detects a frequency and a phase of each subcarrier for the power sent out to the radiation part or the power flowing back from the radiation part to determine the frequency and the phase used for heating based on these pieces of the detected information and therefore can form a plurality of microwave distributions at the same time and achieve heating with high efficiency.

Advantageous Effects of Invention

The high-frequency heating device of the present invention can form a plurality of microwave distributions at the same time without increasing the numbers of oscillators and antennas and can implement the uniform heating and various types of heating control with a small size at low cost.

DETAILED DESCRIPTION OF THE PREFERRED EMBODIMENTS

Figure 1:
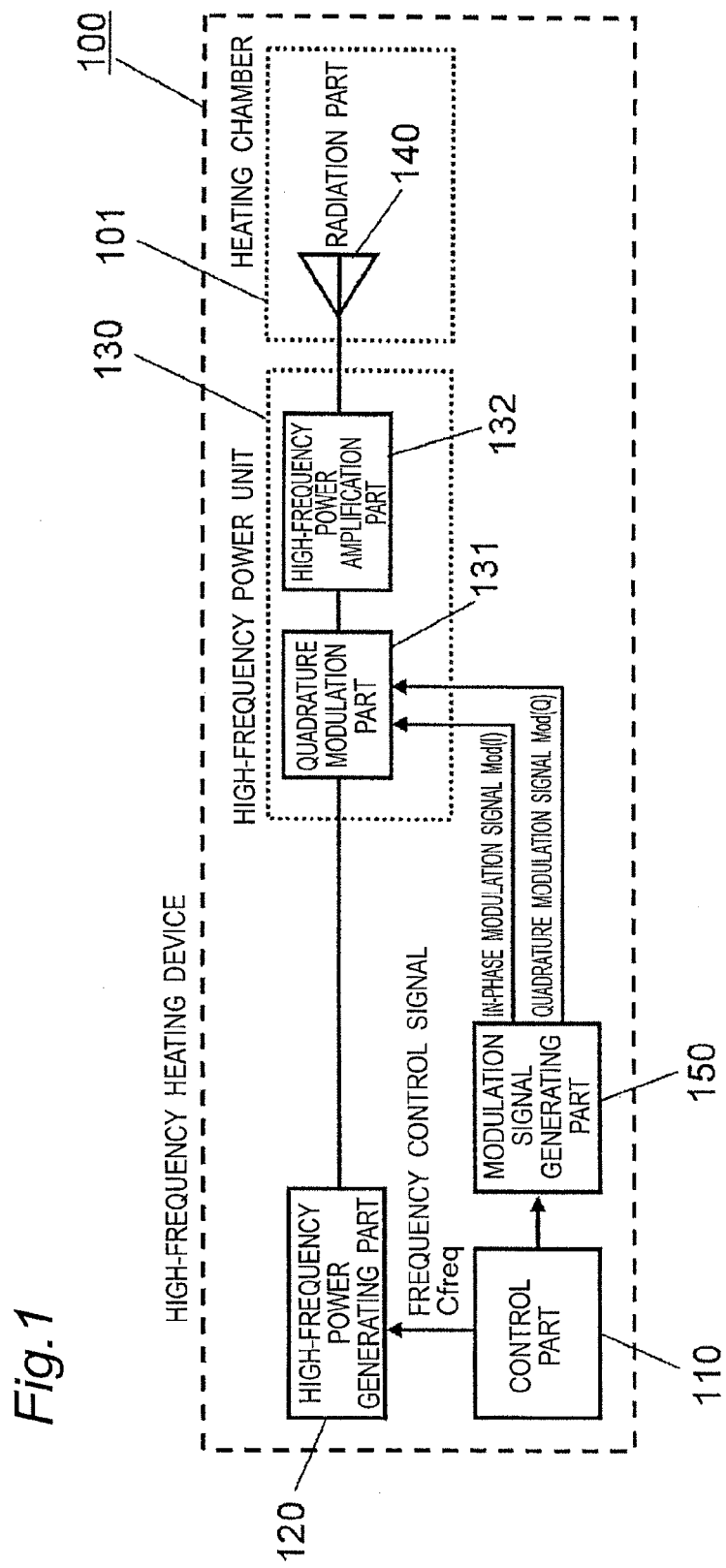
FIG. 1 is a block diagram of a basic configuration of a high-frequency heating device of a first embodiment according to the present invention.

A high-frequency heating device of the first aspect according to the present invention heats an object to be heated housed in a heating chamber wherein the high-frequency heating device comprises:

at least one high-frequency power generating part generating a high-frequency power of a set frequency;

at least one high-frequency power unit including a quadrature modulation part modulating a high-frequency power generated by the high-frequency power generating part with an input modulation signal, and a high-frequency power amplification part amplifying a high-frequency power modulated by the quadrature modulation part to an amplitude of power suitable for heating;

at least one radiation part radiating a high-frequency power output from the high-frequency power unit to the object to be heated;

a modulation signal generating part generating a modulation signal supplied to the quadrature modulation part based on input information of pluralities of frequencies and phases; and a control part setting a reference frequency of a high-frequency power radiated from the radiation part in the high-frequency power generating part, the control part outputting information of individual frequencies and phases of a plurality of high-frequency powers radiated from the radiation part to the modulation signal generating part, the control part supplying the modulation signal generating part with a plurality of pieces of subcarrier information respectively including pieces of information of offset frequencies and phases relative to the reference frequency for a plurality of high-frequency powers radiated from the radiation part, the modulation signal generating part generating an in-phase modulation signal and a quadrature modulation signal based on the plurality of pieces of subcarrier information supplied from the control part, the modulation signal generating part outputting the in-phase modulation signal and the quadrature modulation signal to the quadrature modulation part, the quadrature modulation part performing quadrature modulation of a high-frequency power input from the high-frequency power generating part with the in-phase modulation signal and the quadrature modulation signal input from the modulation signal generating part, the quadrature modulation part outputting a plurality of subcarrier waves of the offset frequencies and the phases relative to the reference frequency.

The high-frequency heating device of the first aspect according to the present invention configured as described above can generate high-frequency powers at pluralities of frequencies and phases for output of one high-frequency power from the high-frequency power generating part to radiate the plurality of high-frequency powers from the same radiation part at the same time to an object to be heated. Therefore, the high-frequency heating device of the first embodiment according to the present invention can form a plurality of microwave distributions at the same time without increasing the numbers of the oscillators and the radiation parts and can implement the uniform heating and various types of heating control with a small size at low cost.

A second aspect according to the present invention, especially the modulation signal generating part of the above-mentioned first aspect is configured to generate the in-phase modulation signal and the quadrature modulation signal by an inverse fast Fourier transform arithmetic process for the plurality of pieces of subcarrier information supplied from the control part and to supply the in-phase modulation signal and the quadrature modulation signal to the modulation signal generating part. The high-frequency heating device of the second aspect according to the present invention configured as described above can control frequencies and phases of a plurality of subcarrier waves radiated from the radiation part with a simple configuration at high speed.

A third aspect according to the present invention, especially the control part of the above-mentioned first aspect further has a subcarrier information storage part storing a plurality of predefined pieces of the subcarrier information, takes out a plurality of suitable pieces of the subcarrier information from the subcarrier information storage part when performing the heating, sets the reference frequency in the high-frequency power generating part, and outputs the subcarrier information to the modulation signal generating part. The high-frequency heating device of the third aspect according to the present invention configured as described above can more appropriately control frequencies and phases of a plurality of subcarrier waves radiated from the radiation part so as to perform the heating desired by a user with a simple configuration at high speed.

A fourth aspect according to the present invention, especially the control part of the above-mentioned second aspect further has a subcarrier information storage part storing a plurality of predefined pieces of the subcarrier information, takes out a plurality of suitable pieces of the subcarrier information from the subcarrier information storage part when performing the heating, sets the reference frequency in the high-frequency power generating part, and outputs the subcarrier information to the modulation signal generating part. The high-frequency heating device of the fourth aspect according to the present invention configured as described above can more appropriately control frequencies and phases of a plurality of subcarrier waves radiated from the radiation part so as to perform the heating desired by a user with a simple configuration at high speed.

A fifth aspect according to the present invention, especially the control part of the above-mentioned first aspect determines the reference frequency such that a maximum value of absolute values of the offset frequencies relative to the reference frequency is minimized in the plurality of the subcarrier waves, and sets the frequency in the high-frequency power generating part. The high-frequency heating device of the fifth aspect according to the present invention configured as described above can narrow a band of an in-phase modulation signal and a quadrature modulation signal supplied to the quadrature modulation part to reduce the loads of a generating circuit of a modulation signal and a modulation signal transmission circuit and can implement the circuits with a small size at low cost.

A sixth aspect according to the present invention, especially the control part of the above-mentioned second aspect determines the reference frequency such that a maximum value of absolute values of the offset frequencies relative to the reference frequency is minimized in the plurality of the subcarrier waves, and sets the frequency in the high-frequency power generating part. The high-frequency heating device of the sixth aspect according to the present invention configured as described above can narrow a band of an in-phase modulation signal and a quadrature modulation signal supplied to the quadrature modulation part to reduce the loads of the generating circuit of a modulation signal and the modulation signal transmission circuit and can implement the circuits with a small size at low cost.

A seventh aspect according to the present invention, especially the control part of the above-mentioned third aspect determines the reference frequency such that a maximum value of absolute values of the offset frequencies relative to the reference frequency is minimized in the plurality of the subcarrier waves, and sets the frequency in the high-frequency power generating part. The high-frequency heating device of the seventh aspect according to the present invention configured as described above can narrow a band of an in-phase modulation signal and a quadrature modulation signal supplied to the quadrature modulation part to reduce the loads of the generating circuit of a modulation signal and the modulation signal transmission circuit and can implement the circuits with a small size at low cost.

An eighth aspect according to the present invention, especially the control part of the above-mentioned fourth aspect determines the reference frequency such that a maximum value of absolute values of the offset frequencies relative to the reference frequency is minimized in the plurality of the subcarrier waves, and sets the frequency in the high-frequency power generating part. The high-frequency heating device of the eighth aspect according to the present invention configured as described above can narrow a band of an in-phase modulation signal and a quadrature modulation signal supplied to the quadrature modulation part to reduce the loads of the generating circuit of a modulation signal and the modulation signal transmission circuit and can implement the circuits with a small size at low cost.

A ninth aspect according to the present invention, especially the high-frequency power unit of any one of the first to eighth aspects further includes a power detection unit, wherein the power detection unit detects an output power sent out from the high-frequency power amplification part to the radiation part and/or a backflow power flowing back from the radiation part to the high-frequency power amplification part, and wherein the control unit determines the subcarrier information supplied to the modulation signal generating part and the reference frequency set in the high-frequency power generating part by using detection information of the output power and/or the backflow power detected by the power detection unit. The high-frequency heating device of the ninth aspect according to the present invention configured as described above detects the power sent out to the radiation part or the power flowing back from the radiation part to determine the frequency and the phase used for heating based on these pieces of the detected information and therefore can form a plurality of microwave distributions at the same time and achieve heating with high efficiency.

A tenth aspect according to the present invention, especially the high-frequency power unit of any one of the first to eighth aspects further includes a power detection unit, wherein the power detection unit detects an output power sent out from the high-frequency power amplification part to the radiation part and/or a backflow power flowing back from the radiation part to the high-frequency power amplification part, wherein the control unit determines the subcarrier information supplied to the modulation signal generating part and the reference frequency set in the high-frequency power generating part by using detection information of the output power and/or the backflow power detected by the power detection unit, wherein the power detection part has a quadrature detection part, wherein the quadrature detection part detects an in-phase detection signal and a quadrature detection signal for demodulating the output power or the backflow power by performing quadrature detection of the output power or the backflow power by using the high-frequency power generated by the high-frequency power generating part, wherein the control part further has a demodulation part, wherein the demodulation part acquires offset frequency and phase information of individual subcarriers by applying a fast Fourier transform (FFT) arithmetic process to the in-phase detection signal and the quadrature detection signal detected by the quadrature detection part, and wherein the control part determines the subcarrier information supplied to the modulation signal generating part and the reference frequency set in the high-frequency power generating part by using the offset frequency and phase information of individual subcarriers acquired by the demodulation part. The high-frequency heating device of the tenth aspect according to the present invention configured as described above detects a frequency and a phase of each subcarrier for the power sent out to the radiation part or the power flowing back from the radiation part to determine the frequency and the phase used for heating based on these pieces of the detected information and therefore can form a plurality of microwave distributions at the same time and achieve heating with high efficiency.

An embodiment according to the high-frequency heating device of the present invention will now be described with reference to the accompanying drawings. The high-frequency heating device of the present invention is not limited to the configuration described in the following embodiment and includes a configuration based on a technical idea equivalent to a technical idea described in the following embodiment.

(First Embodiment)

FIG. 1 is a block diagram of a basic configuration of a high-frequency heating device 100 of a first embodiment according to the high-frequency heating device of the present invention.

The high-frequency heating device 100 depicted in FIG. 1 is a high-frequency heating device dielectrically heating an object to be heated housed in a heating chamber 101 and includes a control part 110, a high-frequency power generating part 120, a high-frequency power unit 130, a radiation part 140, and a modulation signal generating part 150.

The control part 110 controls frequencies and phases of a plurality of high-frequency powers radiated from the radiation part 140. An individual high-frequency power radiated from the radiation part 140 will hereinafter be referred to as a subcarrier wave. Specifically, the control part 110 outputs to the high-frequency power generating part 120 a frequency control signal Cfreq of a reference frequency for generating a plurality of subcarrier waves used for heating in the high-frequency power unit 130.

The control part 110 outputs to the modulation signal generating part 150 the information of offset frequencies and phases relative to the reference frequency for individual subcarrier waves of a plurality of the subcarrier waves used for heating.

The high-frequency power generating part 120 is a frequency-variable power generating part generating a high-frequency power having a frequency set by the control part 110. Specifically, the high-frequency power generating part 120 is, for example, a PLL (phase locked loop) oscillator generating a high-frequency power having a frequency corresponding to the frequency control signal Cfreq input from the control part 110.

Figure 2:
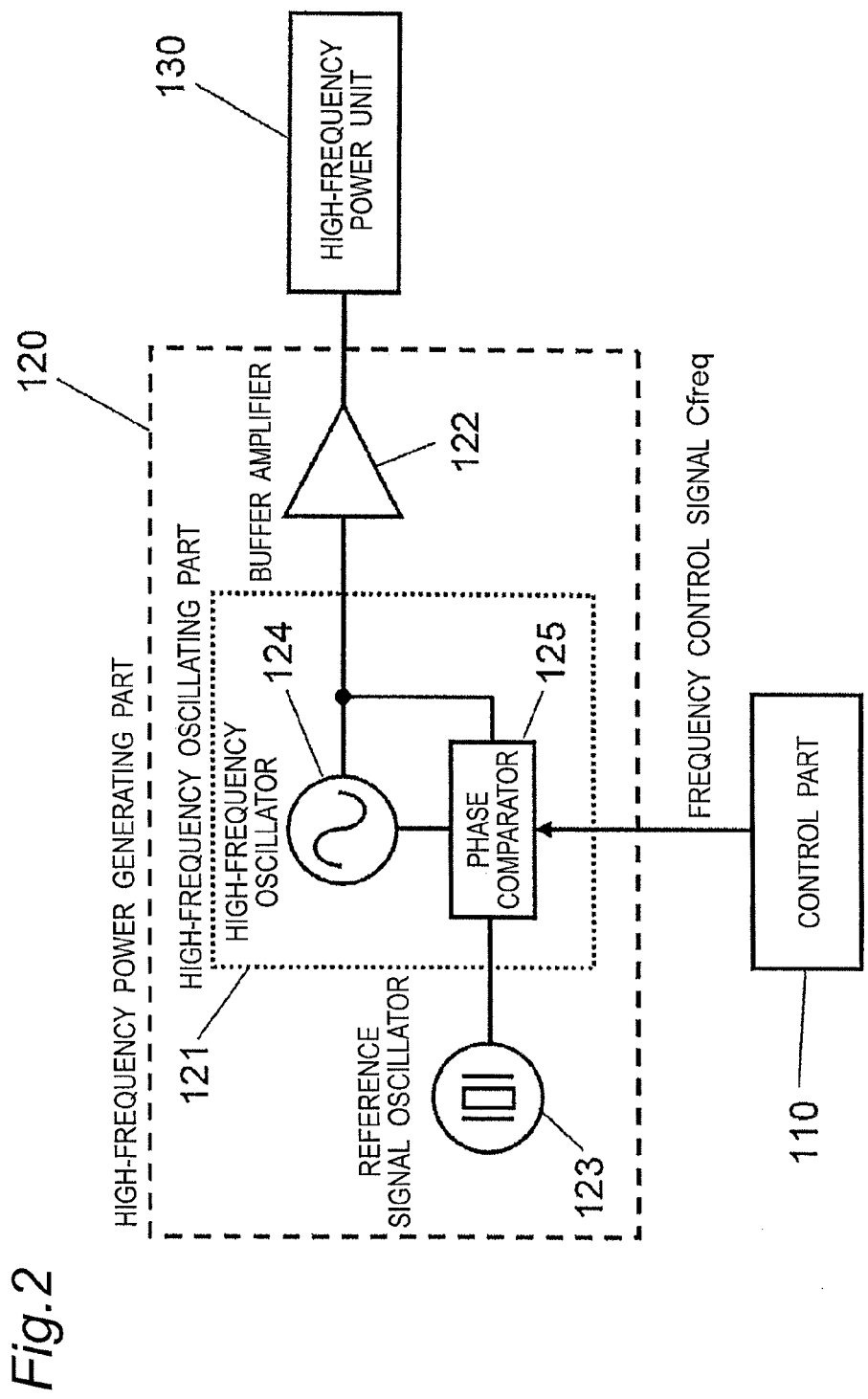
FIG. 2 is a block diagram of a specific configuration of a high-frequency power generating part of the high-frequency heating device of the first embodiment according to the present invention.

FIG. 2 is a block diagram of a specific configuration of the high-frequency power generating part 120. In FIG. 2, the control part 110 and the high-frequency power unit 130 are depicted.

The high-frequency power generating part 120 depicted in FIG. 2 has a high-frequency oscillating part 121, a buffer amplifier 122, and a reference signal oscillator 123.

The high-frequency oscillating part 121 has a high-frequency oscillator 124 and a phase comparator 125. The high-frequency oscillator 124 is, for example, a VCO (voltage controlled oscillator) generating a high-frequency signal having a frequency corresponding to a voltage output from the phase comparator 125.

The phase comparator 125 adjusts an output voltage such that a frequency of a high-frequency power generated from the high-frequency oscillator 124 is adjusted to the frequency set by the frequency control signal Cfreq input from the control part 110. Specifically, the phase comparator 125 compares phases of a signal acquired by dividing the frequency of the high-frequency power generated from the high-frequency oscillator 124 by N and a signal acquired by dividing the frequency of the reference signal input from the reference signal oscillator 123 by R to adjust the voltage output to the high-frequency oscillator 124 such that the phases of the both signals become identical. As a result, the frequency of the high-frequency power generated from the high-frequency oscillator 124 is locked to a frequency acquired by multiplying the frequency of the reference signal input from the reference signal oscillator 123 by N/R. By setting the frequency control signal Cfreq indicative of the values of N and R from the control part 110, the frequency of the high-frequency power generated from the high-frequency oscillator 124 can be controlled.

The buffer amplifier 122 is, for example, a transistor amplifying the high-frequency power generated by the high-frequency oscillating part 121.

The reference signal oscillator 123 is an oscillator with a fixed frequency and is a TCXO (temperature compensated crystal oscillator), for example.

The high-frequency power generating part 120 generates the high-frequency power having the frequency set through the frequency control signal Cfreq by the control part 110. Although the buffer amplifier 122 is depicted as one power amplifier in FIG. 2, the buffer amplifier 122 may be configured as a plurality of power amplifiers disposed and combined in multistage serial connection or in parallel to acquire high-output and large-power output power.

The high-frequency power generated by the high-frequency power generating part 120 is input to the high-frequency power unit 130.

The high-frequency power unit 130 radiates a subcarrier wave generated by quadrature modulation of the high-frequency power input from the high-frequency power generating part 120 with an in-phase modulation signal Mod(I) and a quadrature modulation signal Mod(Q) input from the modulation signal generating part 150, via the radiation part 140 into the heating chamber 101.

A detailed configuration of the high-frequency power unit 130 will be described later.

The radiation part 140 radiates the subcarrier wave generated by the high-frequency power unit 130 into the heating chamber 101 and is an antenna, for example. Although the radiation part 140 is depicted separately from the high-frequency power unit 130 in FIG. 1, this is merely an example and the radiation part 140 may be included in the high-frequency power unit 130.

A detailed configuration of the high-frequency power unit 130 will be described.

As depicted in FIG. 1, the high-frequency power unit 130 has a quadrature modulation part 131 and a high-frequency power amplification part 132.

Figure 3:
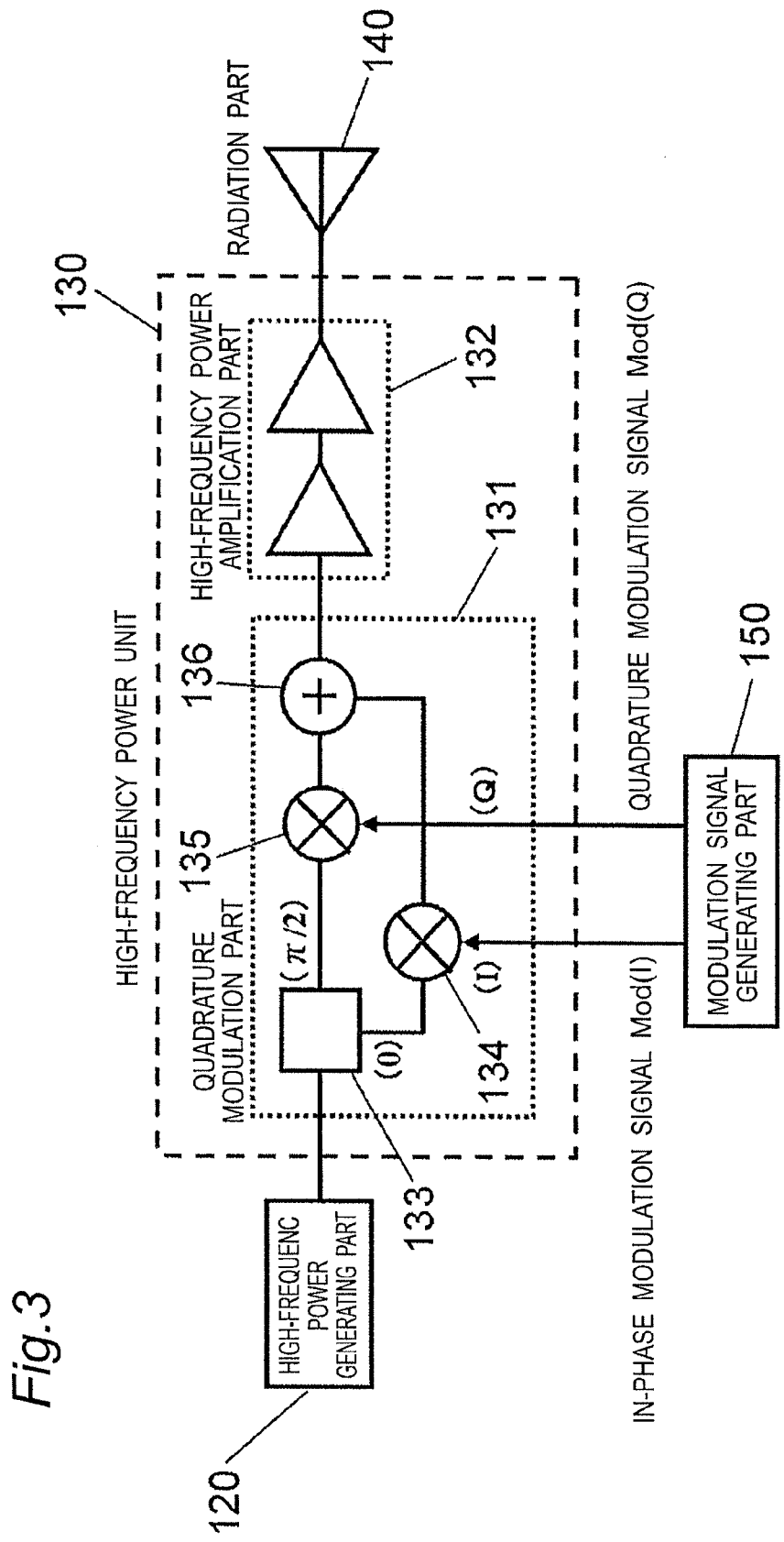
FIG. 3 is a block diagram of a specific configuration of a high-frequency power unit of the high-frequency heating device of the first embodiment according to the present invention.

FIG. 3 is a block diagram of a specific configuration of the high-frequency power unit 130. In FIG. 3, the modulation signal generating part 150, the high-frequency power generating part 120, and the radiation part 140 are depicted.

As depicted in FIG. 3, the high-frequency power unit 130 includes the quadrature modulation part 131 and the high-frequency power amplification part 132. The high-frequency power generating part 120, the quadrature modulation part 131, the high-frequency power amplification part 132, and the radiation part 140 are connected in this order in series. The quadrature modulation part 131 is also connected to the modulation signal generating part 150.

The quadrature modulation part 131 generates a subcarrier wave by quadrature modulation of the high-frequency power input from the high-frequency power generating part 120 with the in-phase modulation signal Mod(I) and the quadrature modulation signal Mod(Q) input from the modulation signal generating part 150 and outputs the subcarrier wave to the high-frequency power amplification part 132. The quadrature modulation part 131 has a π/2 phase shifter 133, an in-phase modulation mixer 134, a quadrature modulation mixer 135, and an adder 136. Each of the in-phase modulation mixer 134 and the quadrature modulation mixer 135 is connected to the modulation signal generating part 150.

The high-frequency power generated by the high-frequency power generating part 120 is input to the π/2 phase shifter 133, which generates an in-phase high-frequency power in phase with the input high-frequency power, and a embodiments the width $W_S$ of the first and second slots 155, 156 is between 1/16 inch and quadrature high-frequency power with the phase shifted by π/2. The in-phase high-frequency power is output to the in-phase modulation mixer 134, and the quadrature high-frequency power is output to the quadrature modulation mixer 135. Although not depicted, a high-frequency power amplifier and a fixed attenuator as well as a low-pass filter may be disposed between the high-frequency power generating part 120 and the π/2 phase shifter 133 for optimization of modulation characteristics of the quadrature modulation part 131.

The in-phase modulation mixer 134 modulates the in-phase high-frequency power input from the π/2 phase shifter 133 by multiplication by the in-phase modulation signal Mod(I) input from the modulation signal generating part 150 and outputs the high-frequency power to the adder 136.

Similarly, the quadrature modulation mixer 135 modulates the quadrature high-frequency power input from the π/2 phase shifter 133 by multiplication by the quadrature modulation signal Mod(Q) input from the modulation signal generating part 150 and outputs the high-frequency power to the adder 136. Although not depicted, a low-pass filter may be disposed before the in-phase modulation mixer 134 and the quadrature modulation mixer 135 after the modulation signal generating part 150 for optimization of modulation characteristics of the quadrature modulation part 131.

The adder 136 adds the modulated high-frequency power input from the in-phase modulation mixer 134 and the modulated high-frequency power input from the quadrature modulation mixer 135 to output the high-frequency power to the high-frequency power amplification part 132.

The high-frequency power amplification part 132 is configured by combining, for example, transistors amplifying the subcarrier waves generated by the quadrature modulation part 131 at a predetermined amplification rate, in multistage serial connection or in parallel.

As described above, the high-frequency power unit 130 generates a subcarrier wave by quadrature modulation of the high-frequency power input from the high-frequency power generating part 120 with the in-phase modulation signal Mod(I) and the quadrature modulation signal Mod(Q) input from the modulation signal generating part 150 and, after amplification with a predetermined amplification gain, radiates the subcarrier wave via the radiation part 140 into the heating chamber 101.

A detailed configuration of the modulation signal generating part 150 will be described.

Figure 4:
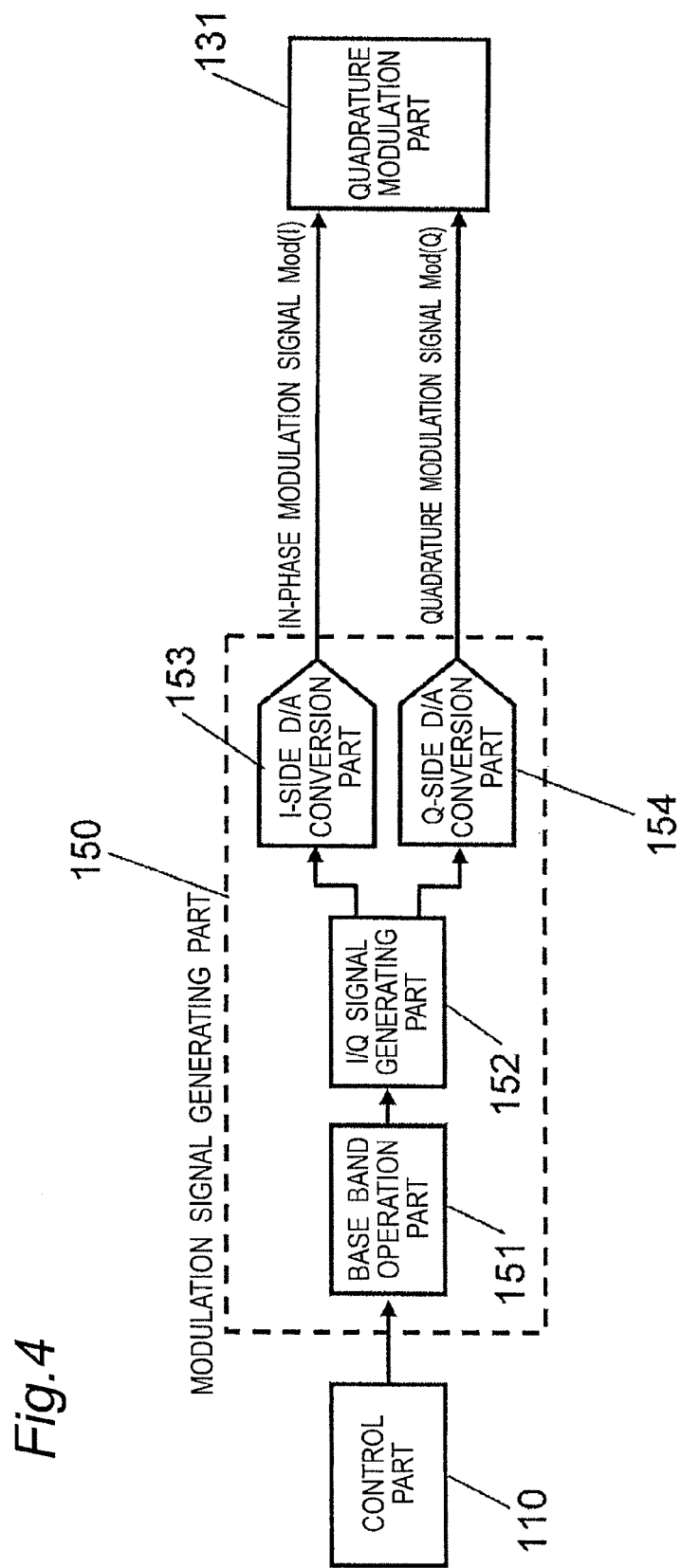
FIG. 4 is a block diagram of a specific configuration of a modulation signal generating part of the high-frequency heating device of the first embodiment according to the present invention.

FIG. 4 is a block diagram of a specific configuration of the modulation signal generating part 150. In FIG. 4, the control part 110 and the quadrature modulation part 131 are depicted.

The modulation signal generating part 150 generates the in-phase modulation signal Mod(I) and the quadrature modulation signal Mod(Q) for generating a plurality of subcarrier waves through the quadrature modulation by the quadrature modulation part 131, from the information of offset frequencies and phases relative to the reference frequency for individual subcarrier waves of a plurality of subcarrier waves input from the control part 110, and outputs the signals to the quadrature modulation part 131.

As depicted in FIG. 4, the modulation signal generating part 150 has a base band operation part 151, an I/Q signal generating part 152, an I-side D/A conversion part 153, and a Q-side D/A conversion part 154.

The base band operation part 151 generates a continuous base band signal by the inverse discrete Fourier transform (IDFT) of the information of offset frequencies and phases relative to the reference frequency for individual subcarrier waves of a plurality of subcarrier waves input from the control part 110, and outputs the signal to the I/Q signal generating part 152. For the operation of IDFT, the inverse fast Fourier transform (IFFT) can be used. This enables high-speed arithmetic processing with a small circuit scale, which is effective for miniaturization and cost reduction of the device.

The I/Q signal generating part 152 generates a real number component and an imaginary number component of the base band signal input from the base band operation part 151 as a real component signal and an imaginary component signal, respectively, and outputs the real component signal and the imaginary component signal to the I-side D/A conversion part 153 and the Q-side D/A conversion part 154, respectively.

The I-side D/A conversion part 153 performs digital-analog conversion of the real component signal input from the I/Q signal generating part 152 and outputs the real component signal converted into an analog signal as the in-phase modulation signal Mod(I) to the quadrature modulation part 131.

Similarly, the Q-side D/A conversion part 154 performs digital-analog conversion of the imaginary component signal input from the I/Q signal generating part 152 and outputs the imaginary component signal converted into an analog signal as the quadrature modulation signal Mod(Q) to the quadrature modulation part 131.

In FIG. 4, each of the I-side D/A conversion part 153 and the Q-side D/A conversion part 154 is depicted as one of the constituent elements of the modulation signal generating part 150; however, this is a merely an example, and the I-side D/A conversion part 153 and the Q-side D/A conversion part 154 may be disposed between the modulation signal generating part 150 and the quadrature modulation part 131 or may be included in the quadrature modulation part 131.

As described above, the modulation signal generating part 150 generates the in-phase modulation signal Mod(I) and the quadrature modulation signal Mod(Q) for generating a subcarrier wave through modulation by the quadrature modulation part 131 from information of offset frequencies and phases relative to the reference frequency for individual subcarrier waves of a plurality of subcarrier waves used for heating input from the control part 110. The modulation signal generating part 150 outputs the in-phase modulation signal Mod(I) and the quadrature modulation signal Mod(Q) generated to the quadrature modulation part 131.

Although not depicted, the control part 110 may be disposed with a subcarrier information storage part storing pieces of predefined information of individual subcarrier waves and may take out the information of subcarriers from the subcarrier information storage part when outputting the information of offset frequencies and phases relative to the reference frequency for individual subcarrier waves of a plurality of the subcarrier waves to the modulation signal generating part 150. The subcarrier information storage part can easily be implemented by using a semiconductor memory etc. This facilitates the determination of subcarriers used for heating, and the frequencies and the phases of a plurality of subcarrier waves radiated from the radiation part 140 can more appropriately controlled at high speed so as to perform the heating desired by a user.

With the configuration described above, the high-frequency heating device 100 of the first embodiment can generate subcarrier waves of pluralities of frequencies and phases for output of a high-frequency power from the high-frequency power generating part 120 to radiate a plurality of the subcarrier waves via the radiation part 140 to the heating chamber 101 at the same time.

An operation of the high-frequency heating device 100 of the first embodiment will be described.

Figure 5:
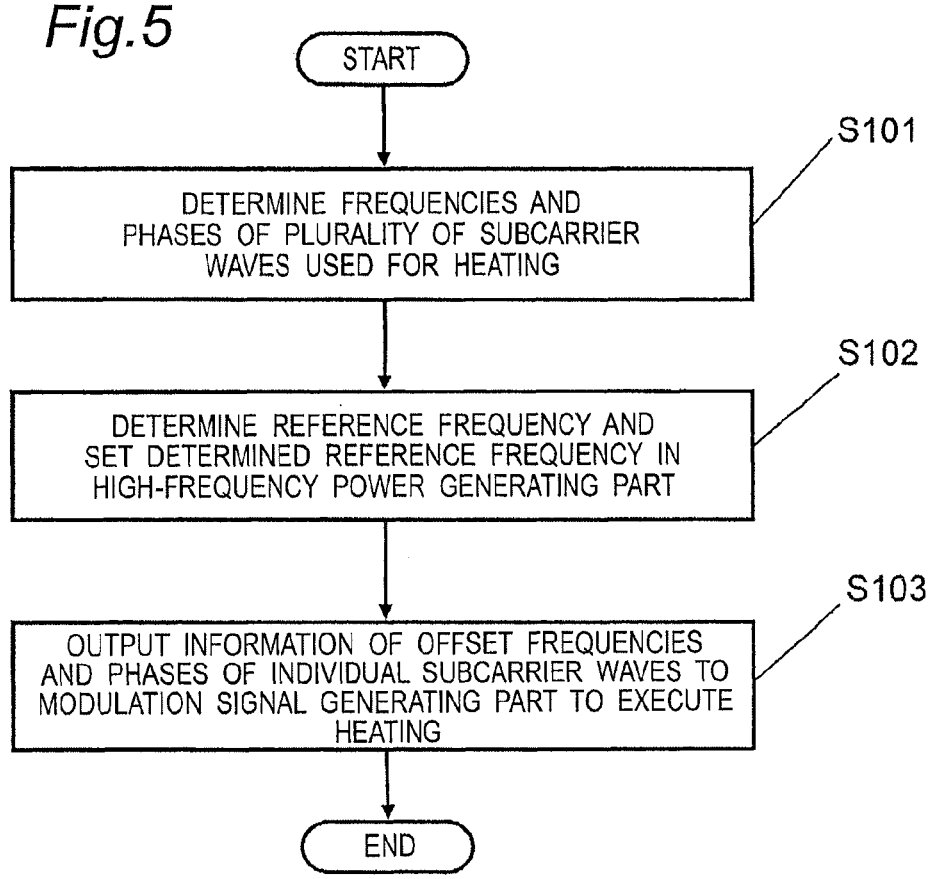
FIG. 5 is a flowchart of a control procedure of the high-frequency heating device of the first embodiment according to the present invention.

FIG. 5 is a flowchart of a control procedure of the high-frequency heating device 100 depicted in FIG. 1. The high-frequency heating device 100 of FIG. 1 executes the following processes in the control part 110.

First, the control part 110 determines frequencies and phases of a plurality of subcarrier waves used for heating (step S101). Specifically, the control part 110 determines values of frequencies and phases of individual subcarrier waves of a plurality of the subcarrier waves used for heating depending on a size and a shape of an object to be heated housed in the heating chamber 101 or an instruction from a user.

After determining the frequencies and the phases of a plurality of the subcarrier waves used for heating at step S101, the control part 110 determines a reference frequency and sets the determined reference frequency in the high-frequency power generating part 120 (step S102). Specifically, the control part 110 determines as the reference frequency the frequency of the high-frequency power supplied from the high-frequency power generating part 120 to the quadrature modulation part 131 and outputs to the high-frequency power generating part 120 the frequency control signal Cfrq for causing the high-frequency power generating part 120 to output the high-frequency power of the reference frequency. This reference frequency can be determined as any frequency within a range of frequency of the high-frequency power that can be generated by the high-frequency power generating part 120. The reference frequency may be selected from frequencies between lowest and highest frequencies usable for heating. A center frequency between the lowest and highest frequencies usable for heating is most commonly determined as the reference frequency.

Lastly, the control part 110 outputs the information of offset frequencies and phases of individual subcarrier waves to the modulation signal generating part 150 to execute the heating treatment (step S103). Specifically, the control part 110 determines the offset frequencies of the individual subcarrier waves based on the frequencies of the individual subcarrier waves determined at step S101 and the reference frequency determined at step S102.

More specifically, frequency differences between the reference frequency determined at step S102 and the frequencies of the individual subcarrier waves determined at step S101 are defined as the offset frequencies of the individual subcarrier waves. This means "offset frequency of subcarrier wave"="frequency of subcarrier wave"−"reference frequency". Therefore, a value of an offset frequency of a subcarrier wave is a positive value when a frequency of the subcarrier wave is higher than the reference frequency, and is a negative value when a frequency of the subcarrier wave is lower than the reference frequency. The value is zero when a frequency of the subcarrier wave is the same as the reference frequency. The values of the offset frequencies of the individual subcarrier waves and the information of phases of the individual subcarrier waves determined at step S101 are output to the modulation signal generating part 150. As a result of the output of the values of the offset frequencies of the individual subcarrier waves and the information of phases of the individual subcarrier waves to the modulation signal generating part 150, the modulation signal generating part 150 generates the in-phase modulation signal Mod(I) and the quadrature modulation signal Mod(Q), and a plurality of the subcarrier waves determined at step S101 is generated in the quadrature modulation part 131 and radiated to the heating chamber 101 via the high-frequency power amplification part 132 and the radiation part 140 into the radiation part 140 to execute the heating treatment.

When the reference frequency is determined at step S102, an intermediate frequency between a lowest frequency and a highest frequency may be determined as the reference frequency out of the frequencies of a plurality of the subcarrier waves determined at step S101. As a result, since a maximum value of absolute values of the offset frequencies of the individual subcarrier waves can be made smaller, a signal band of the in-phase modulation signal Mod(I) and the quadrature modulation signal Mod(Q) generated by the modulation signal generating part 150 can be narrowed and a load of a circuit making up the modulation signal generating part 150 can be reduced. A load of a signal transmission circuit between the modulation signal generating part 150 and the quadrature modulation part 131 can also be reduced. Therefore, the control procedure of the high-frequency heating device 100 of the first embodiment contributes to miniaturization and cost reduction as well as an improvement in reliability of the circuit.

The configuration of the high-frequency heating device 100 of the first embodiment can generate subcarrier waves at pluralities of frequencies and phases for output of the high-frequency power from the same high-frequency power generating part 120 to radiate the plurality of the subcarrier waves from the same radiation part 140 into the heating chamber 101 at the same time. Therefore, the high-frequency heating device 100 of the first embodiment can form a plurality of microwave distributions at the same time without increasing the numbers of the oscillators and the radiation parts and can provide the uniform heating and various types of heating control with a small-sized low-cost configuration.

An example of the operation of forming a plurality of microwave distributions at the same time in the high-frequency heating device 100 of the first embodiment will hereinafter be described.

When an object to be heated is housed in the heating chamber 101 and the high-frequency power is radiated from the radiation part 140, a microwave distribution formed inside the heating chamber 101 has different characteristics depending on a frequency of the high-frequency power radiated from the radiation part 140. The high-frequency power radiated from the radiation part 140 into the heating chamber 101 (hereinafter referred to as a radiated power) is divided into a power directly absorbed by the object to be heated (hereinafter referred to as a directly absorbed power), a power absorbed by the object to be heated after being reflected at least once by a wall surface of the heating chamber 101 (hereinafter referred to as an indirectly absorbed power), and a power repeatedly reflected by wall surfaces of the heating chamber 101 and flowing back to the radiation part 140 without being absorbed by the object to be heated (hereinafter referred to as a backflow power). Although the directly absorbed power and the indirectly absorbed power are absorbed by the object to be heated and the object to be heated is heated, the backflow power turns to a loss power without contributing to heating. Therefore, a smaller rate of the backflow power to the radiated power means a larger power absorbed by the object to be heated and a higher heating efficiency.

Figure 6:
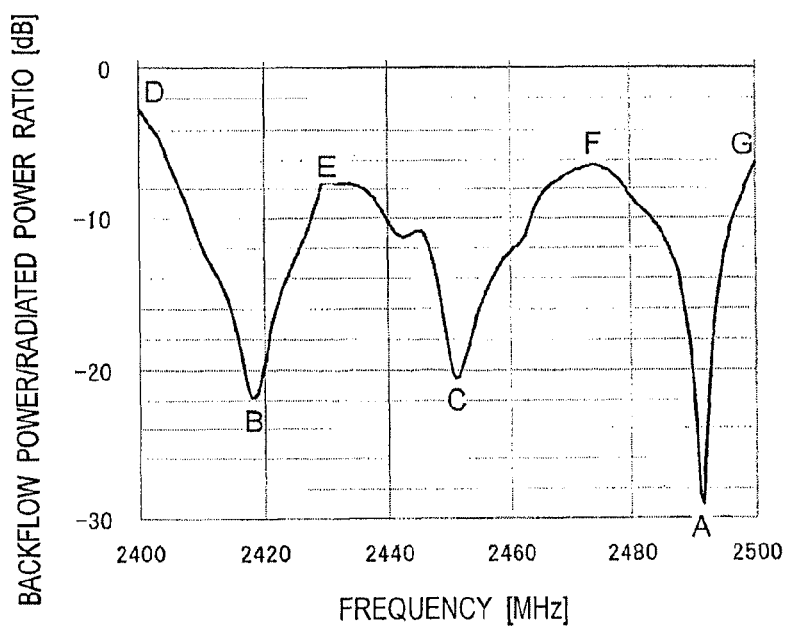
FIG. 6 is a characteristic diagram of characteristics of a radiated-power-to-backflow-power ratio to a radiation frequency of the high-frequency heating device of the first embodiment according to the present invention.

FIG. 6 is a diagram of characteristics of a ratio between the radiated power radiated from the radiation part 140 and the backflow power flowing back to the radiation part 140 at a frequency of the high-frequency power radiated from the radiation part 140 when an object to be heated is housed in the heating chamber 101 in a rectangular parallelepiped shape and a high-frequency power of a single frequency is radiated into the heating chamber 101 from the radiation part 140 made up of one patch antenna disposed in a wall surface of the heating chamber 101. In FIG. 6, the horizontal axis indicates a frequency [MHz] of the high-frequency power radiated from the radiation part 140. The vertical axis indicates a ratio of the backflow power to the radiated power radiated from the radiation part 140 in a decibel value [dB]. In FIG. 6, a smaller value of the ratio of the backflow power to the radiated power represents a smaller backflow power relative to the radiated power and a larger rate of power absorption into the object to be heated.

From FIG. 6, it is understood that the rate of power absorption into the object to be heated varies depending on a frequency of the high-frequency power radiated from the radiation part 140. For example, when the frequency of the high-frequency power radiated from the radiation part 140 is 2492 MHz, the ratio of the backflow power to the radiated power is −29 dB and the rate of power absorption into the object to be heated is maximized (point A). When the frequency of the high-frequency power radiated from the radiation part 140 is 2418 MHz, the ratio of the backflow power to the radiated power is −22 dB (point B) and, when the frequency of the high-frequency power radiated from the radiation part 140 is 2450 MHz, the ratio of the backflow power to the radiated power is −20.5 dB (point C), revealing the presence of three frequencies associated with a larger rate of power absorption into the object to be heated. In contrast, when the frequency of the high-frequency power radiated from the radiation part 140 is 2400 MHz (point D), 2430 MHz (point E), 2475 MHz (point F), and 2500 MHz (point G), the values of the ratio of the backflow power to the radiated power are all very large, indicating that the rate of power absorption into the object to be heated is very small.

As depicted in FIG. 6, the rate of power absorption into the object to be heated varies depending on a frequency of the high-frequency power radiated from the radiation part 140, and this means that different microwave distributions are formed depending on a frequency of the high-frequency power radiated from the radiation part 140. This also means that a region of a strongly heated portion of the object to be heated is different depending on a frequency of the high-frequency power radiated from the radiation part 140.

Figure 7:
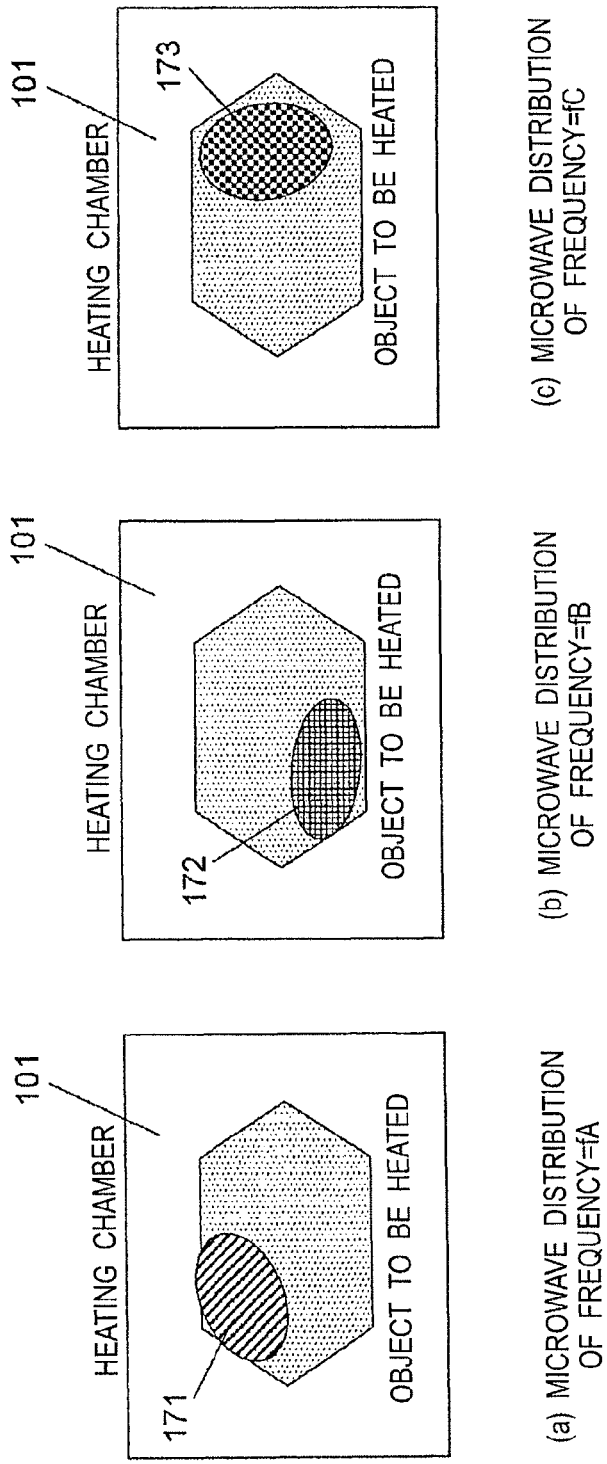
FIGS. 7(a)-7(c) are schematics of microwave distribution at the time of radiation of high-frequency power at one frequency of the high-frequency heating device of the first embodiment according to the present invention.

FIG. 7 schematically depicts a state of microwave distribution when the high-frequency power is radiated from the radiation part 140 into the heating chamber 101 at each of frequencies fA, fB, and fC indicative of the frequencies of the points A, B, and C, respectively, depicted in FIG. 6. FIG. 7(a) depicts a microwave distribution 171 for the object to be heated housed in the heating chamber 101 when the frequency of the high-frequency power radiated from the radiation part 140 is fA. FIG. 7(b) depicts a microwave distribution 172 for the object to be heated housed in the heating chamber 101 when the frequency of the high-frequency power radiated from the radiation part 140 is fB. FIG. 7(c) depicts a microwave distribution 173 for the object to the heated housed in the heating chamber 101 when the frequency of the high-frequency power radiated from the radiation part 140 is fC.

As depicted in FIG. 7, it is understood that when the frequency of the high-frequency power radiated from the radiation part 140 is fA, fB, and fC, respective different microwave distributions are formed with the object to be heated strongly heated in regions of respective different portions.

The control part 110 determines these frequencies fA, fB, and fC as the frequencies of the subcarrier waves (step S101). After the reference frequency is determined at step S102, a plurality of subcarrier waves is generated to perform the heating at step S103.

Figure 8:
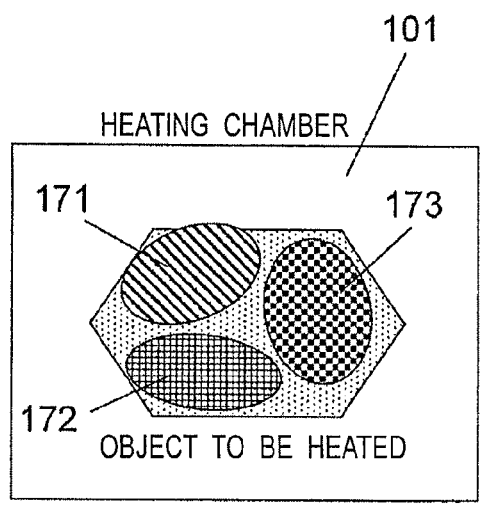
FIG. 8 is a schematic of microwave distribution at the time of simultaneous radiation of high-frequency power at a plurality of frequencies of the high-frequency heating device of the first embodiment according to the present invention.

FIG. 8 is a schematic of a state of microwave distribution for the object to be heated housed in the heating chamber 101 when three subcarrier waves of the frequencies of fA, fB, and fC are radiated at the same time from the radiation part 140. As depicted in FIG. 8, it is understood that, in the microwave distribution when the three subcarrier waves of the frequencies of fA, fB, and fC are radiated at the same time from the radiation part 140, all the microwave distributions at the times of individual radiations of the high-frequency powers of the respective frequencies are formed at the same time.

As described above, the high-frequency heating device 100 of the first embodiment is a high-frequency heating device heating an object to be heated housed in the heating chamber 101 and includes the at least one high-frequency power generating part 120 generating a high-frequency power of a set frequency; the at least one high-frequency power unit 130 each including the quadrature modulation part 131 modulating the high-frequency power generated by the high-frequency power generating part 120 with an input modulation signal and the high-frequency power amplification part 132 amplifying the high-frequency power modulated by the quadrature modulation part 131 to an amplitude of power suitable for heating; the at least one radiation part 140 radiating the high-frequency power output from the high-frequency power unit 130 to the object to be heated; the modulation signal generating part 150 generating the modulation signal supplied to the quadrature modulation part 131 from input information of pluralities of frequencies and phases; and the control part 110 setting the reference frequency of the high-frequency power radiated from the radiation part 140 and outputting to the modulation signal generating part 150 the information of respective frequencies and phases of a plurality of high-frequency powers radiated from the radiation part 140. The control part 110 supplies the modulation signal generating part 150 with a plurality of pieces of subcarrier information respectively including pieces of information of offset frequencies and phases relative to the reference frequency for a plurality of high-frequency powers radiated from the radiation part 140; the modulation signal generating part 150 generates an in-phase modulation signal and a quadrature modulation signal based on a plurality of pieces of the subcarrier information supplied from the control part 110 and outputs the signals to the quadrature modulation part 131; and the quadrature modulation part 131 performs the quadrature modulation of the high-frequency power input from the high-frequency power generating part 120 with the in-phase modulation signal and the quadrature modulation signal input from the modulation signal generating part 150 and outputs a plurality of subcarrier waves having offset frequencies and phases relative to the reference frequencies.

The modulation signal generating part 150 generates the in-phase modulation signal and the quadrature modulation signal by the inverse fast Fourier transform (IFFT) for a plurality of pieces of the subcarrier information supplied from the control part 110 and supplies the signals to the quadrature modulation part 131.

The control part 110 also has the subcarrier information storage part storing a plurality of predefined pieces of subcarrier information, takes out a plurality of suitable subcarrier information from the subcarrier information storage part when performing the heating, sets the reference frequency in the high-frequency power generating part 120, and outputs the subcarrier information to the modulation signal generating part 150.

The control part 110 determines the reference frequency such that the maximum value of absolute values of the offset frequencies relative to the reference frequency is minimized in a plurality of the subcarrier waves, and sets the frequency in the high-frequency power generating part 120.

With the configuration as descried above, high-frequency powers of a plurality of frequencies and phases can be generated for output of one high-frequency power from the high-frequency power generating part 120 to radiate the plurality of the high-frequency powers from the same radiation part 140 at the same time to the object to be heated. As a result, a plurality of microwave distributions can be formed at the same time without increasing the numbers of the oscillators and the radiation parts and the uniform heating and various types of heating control can be implemented with a small size at low cost.

In the configuration of the first embodiment, since the high-frequency heating device 100 has the one high-frequency power generating part 120, the one high-frequency power unit 130, and the one radiation part 140 and a plurality of the subcarrier waves is radiated at the same time from the same radiation part 140, a plurality of the microwave distributions can be formed at the same time in the heating chamber 101 and the uniform heating and the heating control in a wide-range heating region such as uniform heating can easily be provided with a small size at low cost.

(Second Embodiment)

A high-frequency heating device of a second embodiment according to the present invention will hereinafter be described with reference to the accompanying drawings. While the high-frequency heating device 100 of the first embodiment has one set of the high-frequency power unit 130, the radiation part 140, and the modulation signal generating part 150, the high-frequency heating device of the second embodiment is different in that at least two sets of high-frequency power units, radiation parts, and modulation signal generating parts are included. With this configuration, the high-frequency heating device of the second embodiment can radiate the high-frequency powers at pluralities of respective frequencies and phases from a plurality of the radiation parts to provide various types of heating region control with higher efficiency.

The high-frequency heating device of the second embodiment will hereinafter be described mainly in terms of differences from the first embodiment. In the description of the second embodiment, the constituent elements having the same functions as the first embodiment are denoted by the same reference numerals and will not be described. Contents having the same effects as the first embodiment will not be described.

Figure 9:
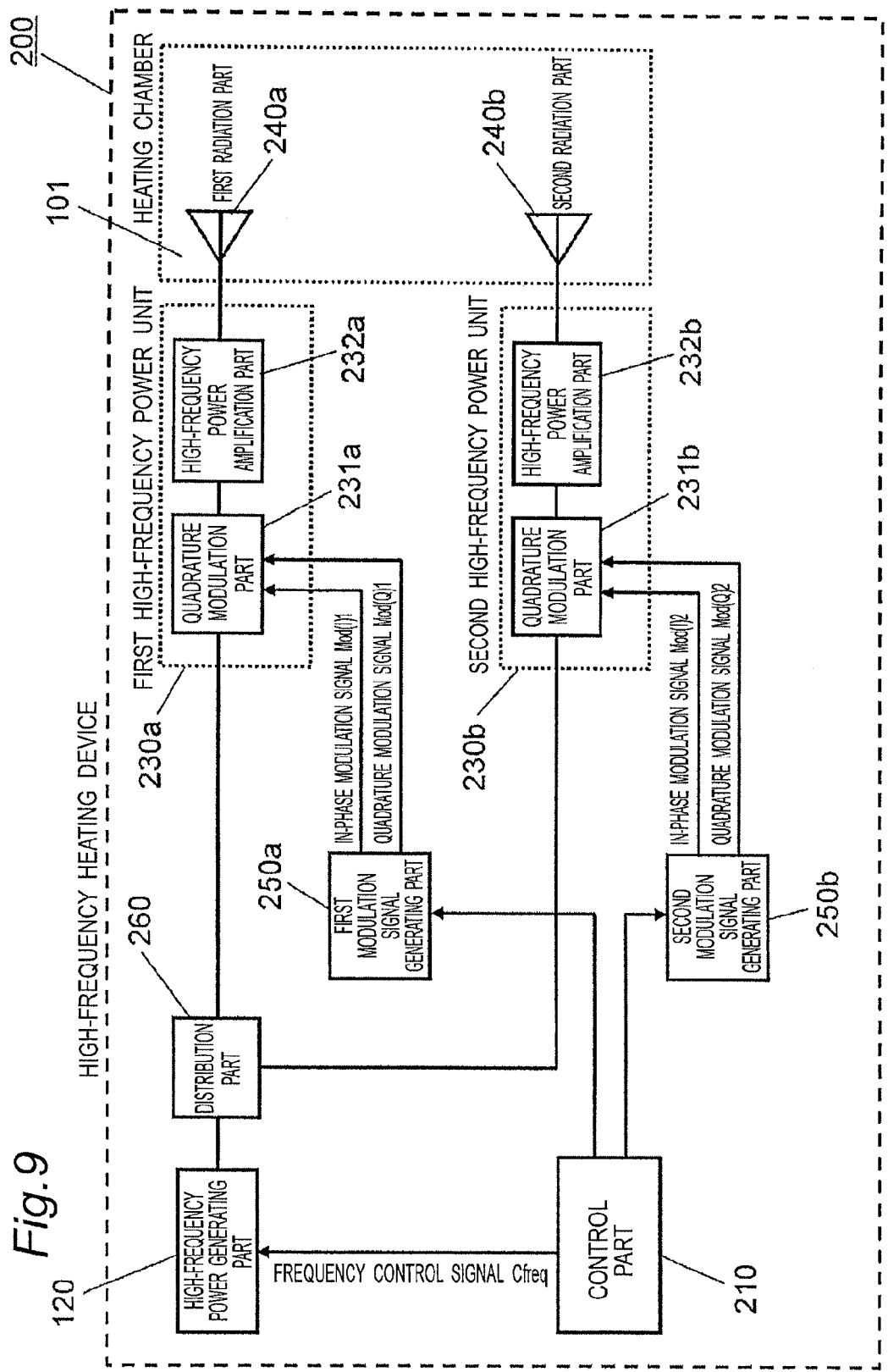
FIG. 9 is a block diagram of a basic configuration of a high-frequency heating device of a second embodiment according to the present invention.

FIG. 9 is a block diagram of a configuration of the high-frequency heating device of the second embodiment according to the present invention.

As compared to the high-frequency heating device 100 of the first embodiment depicted in FIG. 1, a high-frequency heating device 200 depicted in FIG. 9 includes a first high-frequency power unit 230*a* and a second high-frequency power unit 230*b* instead of the high-frequency power unit 130, includes a first radiation part 240*a* and a second radiation part 240*h* instead of the radiation part 140, includes a first modulation signal generating part 250*a* and a second modulation signal generating part 250*b* instead of the modulation signal generating part 150, includes a control part 210 instead of the control part 110, and further includes a distribution part 260.

The high-frequency power generating part 120 generates a high-frequency power having a frequency set by the frequency control signal Cfreq input from the control part 210. The generated high-frequency power is distributed by the distribution part 260 and input to the first high-frequency power unit 230*a* and the second high-frequency power unit 230*b*. Therefore, the high-frequency power generating part 120 supplies the high-frequency power to the first high-frequency power unit 230*a* and the second high-frequency power unit 230*b*.

The first high-frequency power unit 230*a* radiates a subcarrier wave generated by quadrature modulation of the high-frequency power input from the distribution part 260 with an in-phase modulation signal Mod(I)1 and a quadrature modulation signal Mod(Q)1 input from the first modulation signal generating part 250*a*, via the first radiation part 240*a* to the heating chamber 101. The second high-frequency power unit 230*b* radiates a subcarrier wave generated by quadrature modulation of the high-frequency power input from the distribution part 260 with an in-phase modulation signal Mod(I)2 and a quadrature modulation signal Mod(Q)2 input from the second modulation signal generating part 250*b*, via the second radiation part 240*b* to the heating chamber 101.

The first high-frequency power unit 230*a* has a quadrature modulation part 231*a* and a high-frequency power amplification part 232*a*. The second high-frequency power unit 230b has a quadrature modulation part 231b and a high-frequency power amplification part 232b.

The quadrature modulation part 231a generates a subcarrier wave by quadrature modulation of the high-frequency power input from the distribution part 260 with the in-phase modulation signal Mod(I)1 and the quadrature modulation signal Mod(Q)1 input from the first modulation signal generating part 250a and outputs the subcarrier wave to the high-frequency power amplification part 232a. The quadrature modulation part 231b generates a subcarrier wave by quadrature modulation of the high-frequency power input from the distribution part 260 with the in-phase modulation signal Mod(I)2 and the quadrature modulation signal Mod(Q)2 input from the second modulation signal generating part 250b and outputs the subcarrier wave to the high-frequency power amplification part 232b.

The high-frequency power amplification part 232a amplifies the subcarrier wave generated by the quadrature modulation part 231a at a predetermined amplification rate and outputs the subcarrier wave to the first radiation part 240a. The high-frequency power amplification part 232b amplifies the subcarrier wave generated by the quadrature modulation part 231b at a predetermined amplification rate and outputs the subcarrier wave to the second radiation part 240b.

Specific configurations of the quadrature modulation parts 231a and 231b and the high-frequency power amplification parts 232a and 232b are the same as the specific configurations of the quadrature modulation part 131 and the high-frequency power amplification part 132 depicted in FIG. 3 described in the first embodiment and therefore will not be described.

The first radiation part 240a and the second radiation part 240b radiate the respective subcarrier waves generated by the first high-frequency power unit 230a and the second high-frequency power unit 230b into the heating chamber 101 and are antennas, for example. Although the first radiation part 240a and the second radiation part 240b are depicted separately from the first high-frequency power unit 230a and the second high-frequency power unit 230b in FIG. 9, this is merely an example and the first radiation part 240a and the second radiation part 240b may be included in the first high-frequency power unit 230a and the second high-frequency power unit 230b.

The control part 210 controls frequencies and phases of a plurality of subcarriers radiated from each of the first radiation part 240a and the second radiation part 240b. Specifically, the control part 210 outputs to the high-frequency power generating part 120 the frequency control signal Cfreq of a reference frequency for generating a plurality of subcarrier waves used for heating in the first high-frequency power unit 230a and the second high-frequency power unit 230b.

The control part 210 outputs to the first modulation signal generating part 250a the information of offset frequencies and phases relative to the reference frequency for individual subcarrier waves of a plurality of the subcarrier waves generated by the first high-frequency power unit 230a used for heating. Concurrently, the control part 210 outputs to the second modulation signal generating part 250b the information of offset frequencies and phases relative to the reference frequency for individual subcarrier waves of a plurality of the subcarrier waves generated by the second high-frequency power unit 230b used for heating.

The first modulation signal generating part 250a generates the in-phase modulation signal Mod(I)1 and the quadrature modulation signal Mod(Q)1 from the information of offset frequencies and phases relative to the reference frequency for individual subcarrier waves of a plurality of subcarrier waves generated by the first high-frequency power unit 230a input from the control part 210, and outputs the signals to the quadrature modulation part 231a. The second modulation signal generating part 250b generates the in-phase modulation signal Mod(I)2 and the quadrature modulation signal Mod(Q)2 from the information of offset frequencies and phases relative to the reference frequency for individual subcarrier waves of a plurality of subcarrier waves generated by the second high-frequency power unit 230b input from the control part 210, and outputs the signals to the quadrature modulation part 231b.

Specific configurations of the first modulation signal generating part 250a and the second modulation signal generating part 250b are the same as the specific configuration of the modulation signal generating part 150 depicted in FIG. 4 described in the first embodiment and therefore will not be described.

The distributing part 260 distributes the high-frequency power input from the high-frequency power generating part 120 into two parts and inputs the respective distributed high-frequency powers to the first high-frequency power unit 230a and the second high-frequency power unit 230b. The distributing part 260 may be implemented by using a resistance distributor or by using either a directional coupler or a hybrid coupler.

As compared to the control part 110 depicted in FIG. 1, the control part 210 outputs to the two modulation signal generating parts, i.e., the first modulation signal generating part 250a and the second modulation signal generating part 250b, the information of offset frequencies and phases relative to the reference frequency for individual subcarrier waves of a plurality of the subcarrier waves generated by the first high-frequency power unit 230a and the information of offset frequencies and phases relative to the reference frequency for individual subcarrier waves of a plurality of the subcarrier waves generated by the second high-frequency power unit 230b. As a result, the control part 210 sets the individual frequencies and phases of a plurality of subcarrier waves generated by the first high-frequency power unit 230a and the frequencies and phases of individual subcarrier waves of a plurality of subcarrier waves generated by the second high-frequency power unit 230b independently of each other.

A basic control procedure of the high-frequency heating device 200 of the second embodiment is the same as the control procedure of the high-frequency heating device 100 described in the first embodiment. However, while the high-frequency heating device 100 of the first embodiment described with reference to FIG. 1 has the one high-frequency power generating part 120 corresponding to one set of the high-frequency power unit 130 and the radiation part 140, the high-frequency heating device 200 of the second embodiment depicted in FIG. 9 is different in that the one high-frequency power generating part 120 corresponds to two sets of the first high-frequency power unit 230a/the first radiation part 240a and the second high-frequency power unit 230b/the second radiation part 240b. This configuration enables a plurality of the radiation parts to radiate pluralities of subcarriers set independently of each other.

Therefore, the high-frequency heating device 200 of the second embodiment can provide the control of microwave distribution depending on a difference between disposition positions of the radiation parts 240a, 240b, and the control of the microwave distribution depending on spatial power combining of the microwaves in the heating chamber 101 in addition to the control of a heating region depending on a frequency, and can provide more complex control of a heating region.

In FIG. 9, while the high-frequency heating device 200 is made up of two sets of the high-frequency power units, the radiation parts, and the modulation signal generating parts (the first high-frequency power unit 230a, the first radiation part 240a, and the first modulation signal generating part 250a as well as the second high-frequency power unit 230b, second radiation part 240b, and the second modulation signal generating part 250b), the number of sets of the high-frequency power units, the radiation parts, and the modulation signal generating parts is not limited to the configuration described above, and it is only necessary for the present invention to include a plurality of sets of the high-frequency power units, the radiation parts, and the modulation signal generating parts.

An example of the control operation of microwave distribution in the high-frequency heating device 200 of the second embodiment will hereinafter be described.

When an object to be heated is housed in the heating chamber 101 and the high-frequency power of a certain frequency (e.g., frequency fA) is radiated from a plurality of the radiation parts (the first radiation part 240a and the second radiation part 240b), a microwave distribution formed within the heating chamber 101 has different characteristics depending on the radiation parts radiating the high-frequency powers (the first radiation part 240a and the second radiation part 240b).

Figure 10:
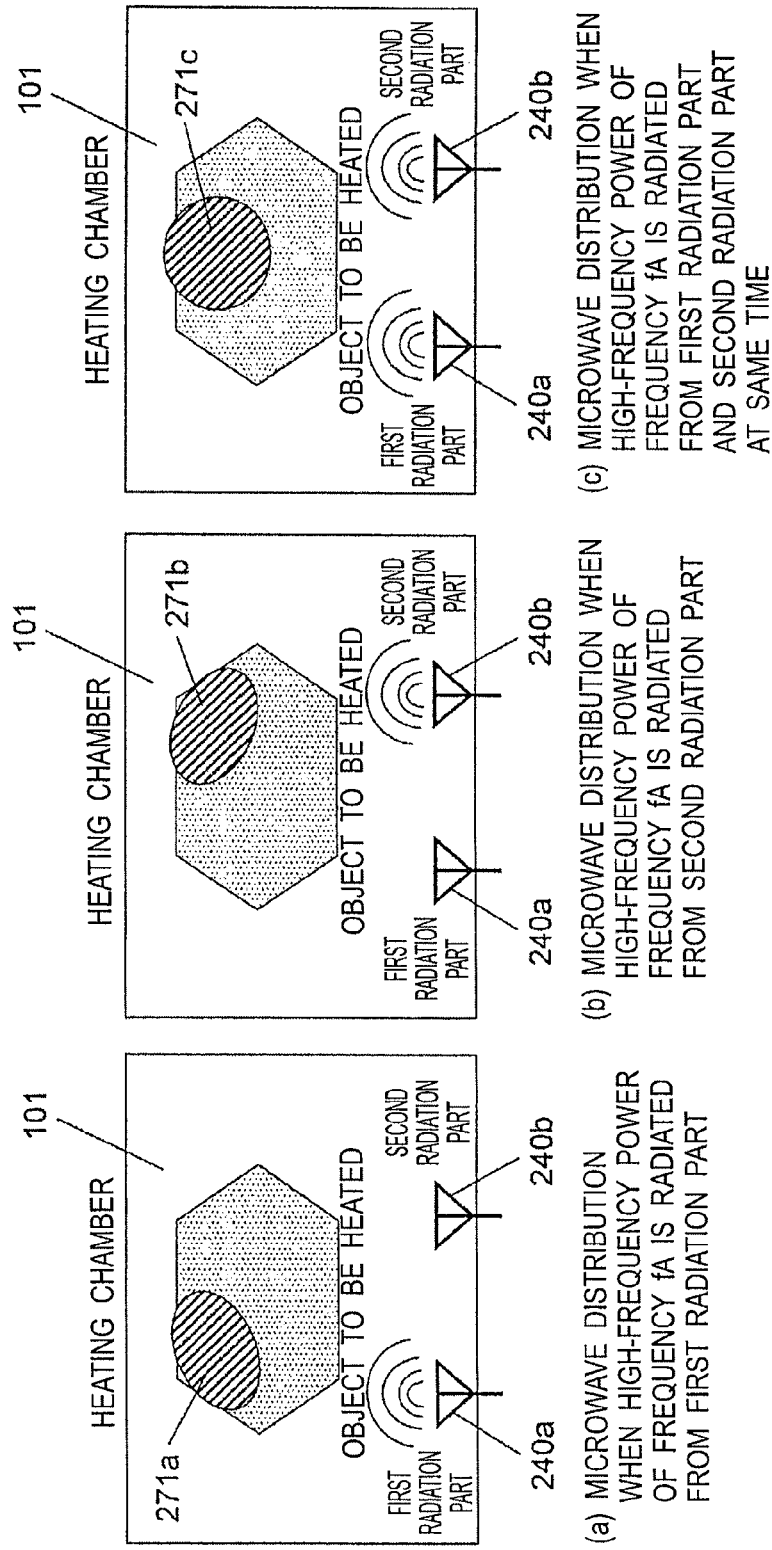
FIGS. 10(a)-10(c) are schematics of microwave distribution depending on positions of radiation parts of the high-frequency heating device of the second embodiment according to the present invention.

FIG. 10 is a schematic of a state of microwave distribution for the object to be heated when the object to be heated is housed in the heating chamber 101 in a rectangular parallelepiped shape and a high-frequency power of a single frequency (e.g., frequency fA) is radiated into the heating chamber 101 from the first radiation part 240a and the second radiation part 240b made up of two patch antennas disposed in a wall surface of the heating chamber 101.

FIG. 10(a) depicts a microwave distribution 271a for the object to be heated housed in the heating chamber 101 when the high-frequency power of the frequency fA is radiated only from the first radiation part 240a. FIG. 10(b) depicts a microwave distribution 271b for the object to be heated housed in the heating chamber 101 when the high-frequency power of the frequency fA is radiated only from the second radiation part 240b. FIG. 10(c) depicts a microwave distribution 271c for the object to be heated housed in the heating chamber 101 when the high-frequency power of the frequency fA is radiated from the first radiation part 240a and the second radiation part 240b at the same time.

As depicted in FIG. 10, respective different microwave distributions are formed when the radiation part radiating the high-frequency power of the frequency fA (the first radiation part 240a and the second radiation part 240b) is only the first radiation part 240a, when the radiation part is only the second radiation part 240b, and when the high-frequency power is radiated from the first radiation part 240a and the second radiation part 240b at the same time. As depicted in FIG. 10, it is understood that when the radiation part radiating the high-frequency power is different, the object to be heated is strongly heated in regions of respective different portions. Particularly, when the high-frequency powers of the frequency fA depicted in FIG. 10(c) are radiated from the first radiation part 240a and the second radiation part 240b at the same time, the microwave distribution is different from the microwave distribution at the time of radiation of the high-frequency power only from the first radiation part 240a depicted in FIG. 10(a) and the microwave distribution at the time of radiation of the high-frequency power only from the second radiation part 240b depicted in FIG. 10(b). This is because if the high-frequency powers having the same frequency are radiated from a plurality of the radiation parts (the first radiation part 240a and the second radiation part 240b) at the same time into the heating chamber 101, the high-frequency powers radiated from the respective radiation parts (the first radiation part 240a and the second radiation part 240b) is subjected to the spatial power combining in the heating chamber 101.

A control procedure of the high-frequency heating device 200 of the second embodiment will hereinafter be described with reference to the flow chart of FIG. 5 used for describing the control procedure of the high-frequency heating device 100 of the first embodiment.

The control part 210 determines the frequencies and phases of individual subcarrier waves for each of the radiation parts (the first radiation part 240a and the second radiation part 240b) radiating the subcarrier waves (step S101). After determining the reference frequency at step S102, the information of the frequencies and phases of individual subcarrier waves is output at step S103 to the modulation signal generating parts (the first modulation signal generating part 250a and the second modulation signal generating part 250b) corresponding to the respective radiation parts (the first radiation part 240a and the second radiation part 240b) to respectively generate pluralities of subcarrier waves radiated from the respective radiation parts (the first radiation part 240a and the second radiation part 240b). The generated pluralities of subcarrier waves are radiated from the first radiation part 240a and the second radiation part 240b to execute the heating treatment.

Figure 11:
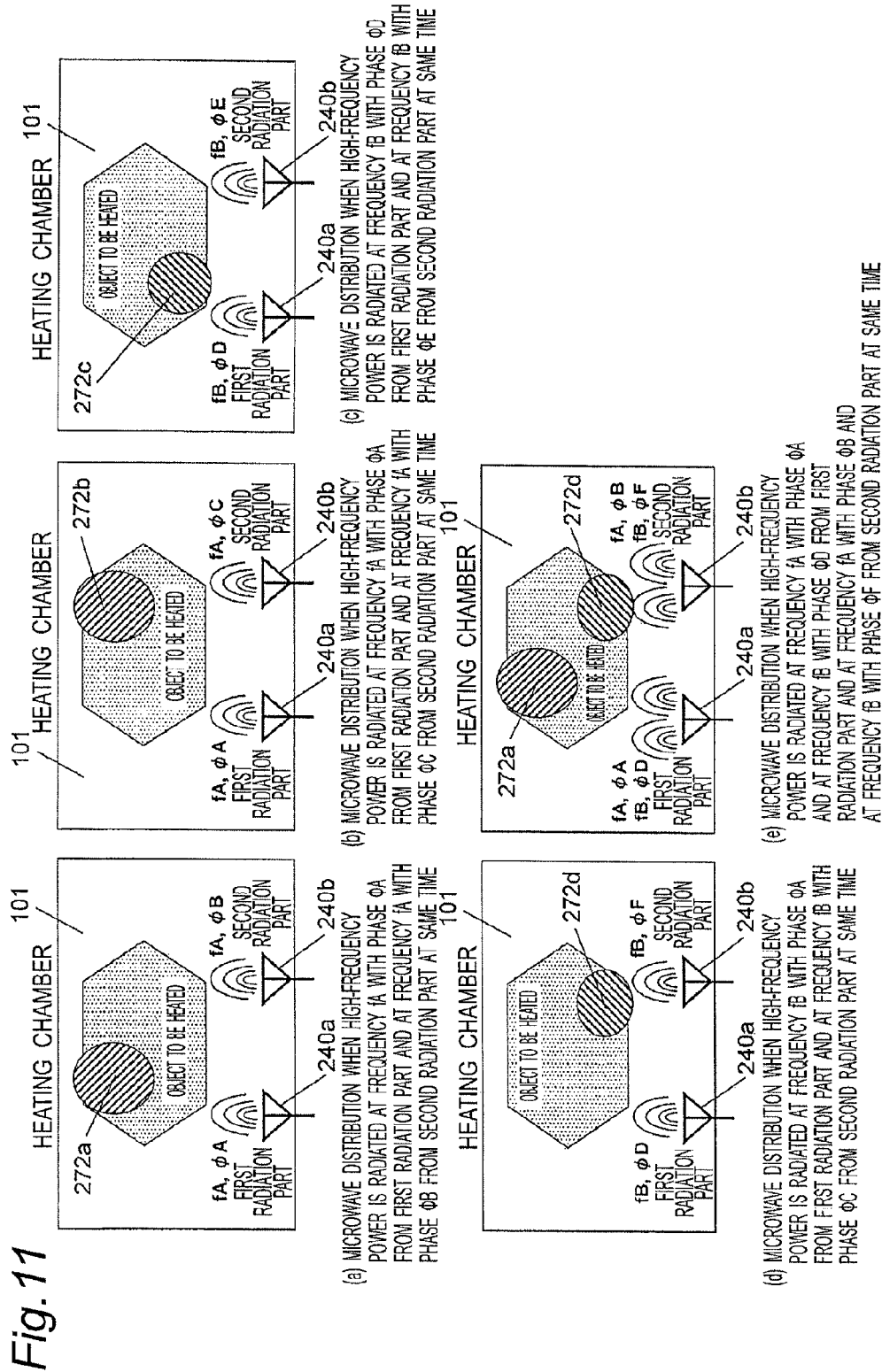
FIG. 11 is a schematic of microwave distribution depending on spatial power combining of the high-frequency heating device of the second embodiment according to the present invention.

FIG. 11 is a schematic of how microwave distribution for an object to be heated changes due to the spatial power combining described above by changing a phase difference between the high-frequency powers radiated from the respective radiation parts (the first radiation part 240a and the second radiation part 240b) when the high-frequency powers are radiated from a plurality of the radiation parts (the first radiation part 240a and the second radiation part 240b) at the same time.

FIG. 11(a) depicts a microwave distribution 272a for the object to be heated housed in the heating chamber 101 when the first radiation part 240a radiates the high-frequency power of the frequency fA with a phase φA while the second radiation part 240b radiates the high-frequency power of the frequency fA with a phase φB at the same time. In this case, the high-frequency powers radiated from the first radiation part 240a and the second radiation part 240b have the same frequency and therefore are subjected to the spatial power combining in the heating chamber 101 to form the microwave distribution 272a.

FIG. 11(b) depicts a microwave distribution 272b for the object to be heated housed in the heating chamber 101 when the first radiation part 240a radiates the high-frequency power of the frequency fA with the phase φA while the second radiation part 240b radiates the high-frequency power of the frequency fA with a phase φC at the same time. In FIG. 11(b), as compared to the case of FIG. 11(a), the phase of the high-frequency power radiated from the second radiation part 240b is different. While the phase difference between the high-frequency powers radiated from the two radiation parts (the first radiation part 240a and the second radiation part 240b) is φB−φA in FIG. 11(a), the phase difference between the high-frequency powers radiated from the two radiation parts (the first radiation part 240a and the second radiation part 240b) is φC−φA in FIG. 11(b). Even if the high-frequency powers radiated from the two radiation parts (the first radiation part 240a and the second radiation part 240b) have the same frequencies, different microwave distributions are formed when the phase difference between the respective high-frequency powers is different. By changing the phase difference, various microwave distributions can be formed in the heating chamber 101.

FIG. 11(c) and FIG. 11(d) depict a state of microwave distribution when the frequency of the high-frequency powers radiated from the respective radiation parts (the first radiation part 240a and the second radiation part 240b) is changed as compared to the case of FIG. 11(a) and FIG. 11(b). FIG. 11(c) depicts a microwave distribution 272c for the object to be heated housed in the heating chamber 101 when the first radiation part 240a radiates the high-frequency power of the frequency fB with a phase φD while the second radiation part 240b radiates the high-frequency power of the frequency fB with a phase φE at the same time. FIG. 11(d) depicts a microwave distribution 272d for the object to be heated housed in the heating chamber 101 when the first radiation part 240a radiates the high-frequency power of the frequency fB with the phase φD while the second radiation part 240b radiates the high-frequency power of the frequency fB with the phase φF at the same time.

In FIG. 11(c) and FIG. 11(d), as is the case with FIG. 11(a) and FIG. 11(b), the high-frequency powers radiated from the respective radiation parts (the first radiation part 240a and the second radiation part 240b) have the same frequency and therefore are subjected to the spatial power combining in the heating chamber 101 to form the respective microwave distributions 272c and 272d. The respective microwave distributions (the microwave distributions 272c and 272d) are different in FIG. 11(c) and FIG. 11(d) because the phase difference between the high-frequency powers radiated from the respective radiation parts (the first radiation part 240a and the second radiation part 240b) is different. While the phase difference is φE−φD in the case of FIG. 11(c), the phase difference is φF−φD in the case of FIG. 11(d) and, therefore, the phase difference is different.

FIG. 11(e) depicts the microwave distributions 272a and 272d formed in the heating chamber 101 when the first radiation part 240a radiates two high-frequency powers of the frequency fA with the phase φA and the frequency fB with the phase φD and the second radiation part 240b radiates two high-frequency powers of the frequency fA with the phase φB and the frequency fB with the phase 9F. As depicted in FIG. 11(e), it is understood that the microwave distribution 272a in the case of FIG. 11(a) and the microwave distribution 272d in the case of FIG. 11(d) are formed at the same time. This is because the high-frequency powers of different frequencies do not interfere with each other.

According to the configuration of the second embodiment, since the one high-frequency power generating part 120 corresponds to two sets of the first high-frequency power unit 230a/the first radiation part 240a and the second high-frequency power unit 230b/the second radiation part 240b, the high-frequency heating device 200 can radiate a plurality of high-frequency powers of arbitrary frequencies from the first radiation part 240a and the second radiation part 240b at the same time. The high-frequency heating device 200 can also radiate a plurality of combinations of high-frequency powers of the same frequency with different phases from the first radiation part 240a and the second radiation part 240b at the same time.

Therefore, the high-frequency heating device 200 can provide the control of microwave distribution depending on a difference between disposition positions of the radiation parts and the control of the microwave distribution depending on the spatial power combining of the microwaves in the heating chamber 101 in addition to the control of a heating region depending on a frequency, and can provide more complex control of a heating region.

(Third Embodiment)

A high-frequency heating device of a third embodiment according to the present invention will hereinafter be described with reference to the accompanying drawings. The high-frequency heating device of the third embodiment is different from the configuration of the high-frequency heating device 100 of the first embodiment in that a demodulation part is further included in the configuration of the high-frequency heating device 100 of the first embodiment described above and that the high-frequency power unit 130 of the high-frequency heating device 100 of the first embodiment further has a distribution part and a power detection part. With this configuration, the high-frequency heating device of the third embodiment can detect a plurality of subcarrier waves radiated from the radiation part 140 to the heating chamber 101 and a plurality of subcarrier waves flowing back from the heating chamber 101 to the radiation part 140 for respective individual subcarrier waves. Therefore, the high-frequency heating device of the third embodiment can comprehend efficiency for each of the individual subcarrier waves and can provide various types of heating region control with higher efficiency.

The high-frequency heating device of the third embodiment will hereinafter be described mainly in terms of differences from the first embodiment. In the description of the third embodiment, the constituent elements having the same functions as the first embodiment are denoted by the same reference numerals and will not be described. Contents having the same effects as the first embodiment will not be described.

Figure 12:
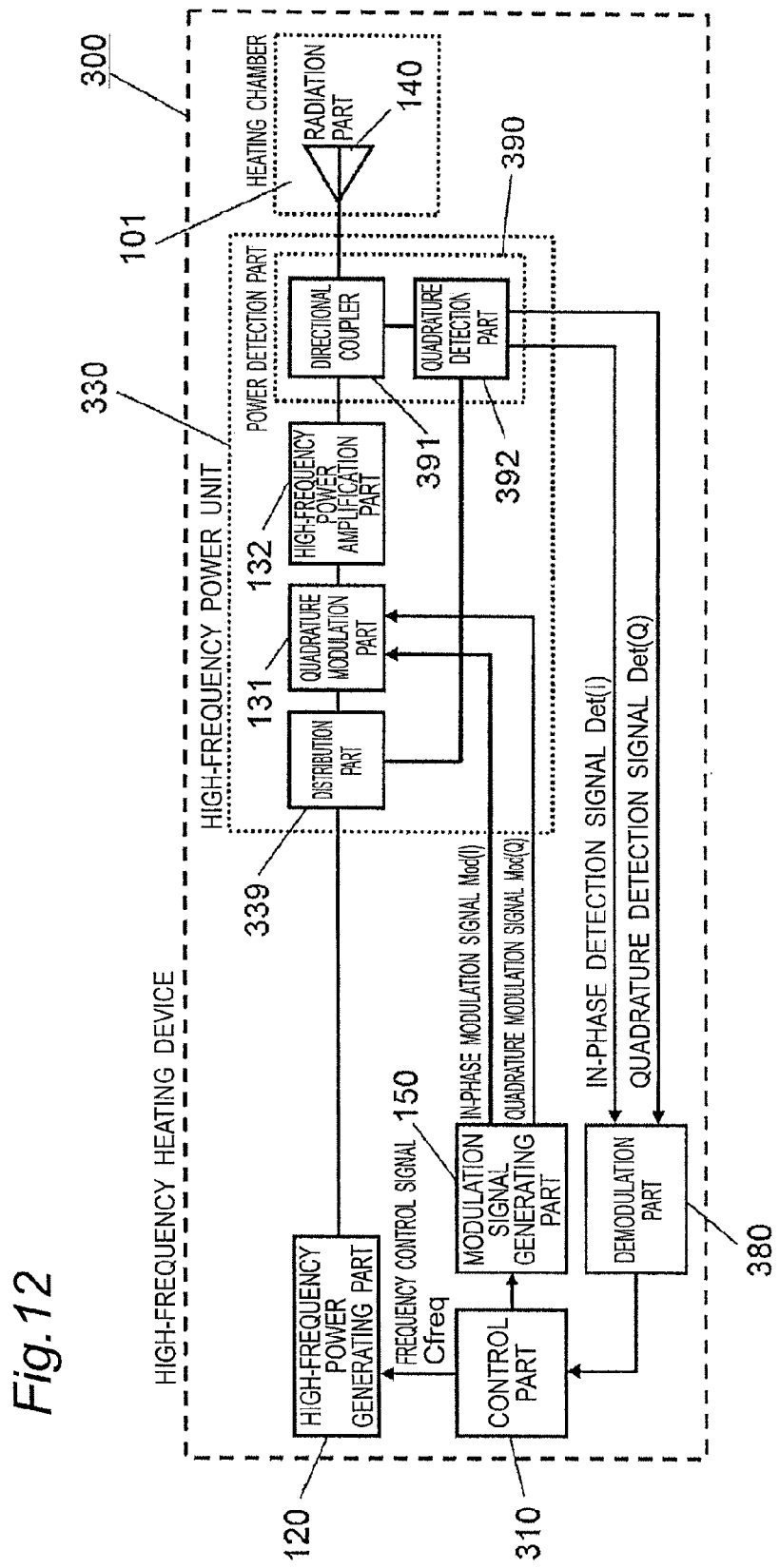
FIG. 12 is a block diagram of a basic configuration of a high-frequency heating device of a third embodiment according to the present invention.

FIG. 12 is a block diagram of a configuration of the high-frequency heating device of the third embodiment according to the present invention.

As compared to the high-frequency heating device 100 of the first embodiment depicted in FIG. 1, a high-frequency heating device 300 depicted in FIG. 12 includes a high-frequency power unit 330 instead of the high-frequency power unit 130, includes a control part 310 instead of the control part 110, and further includes a demodulation part 380.

The high-frequency power generating part 120 generates a high-frequency power having a frequency set by the frequency control signal Cfreq input from the control part 210 and the high-frequency power is input to the high-frequency power unit 330.

The high-frequency power unit 330 radiates a subcarrier wave generated by quadrature modulation of the high-frequency power input from the high-frequency power generating part 120 with the in-phase modulation signal Mod(I) and the quadrature modulation signal Mod(Q) input from the modulation signal generating part 150, via the radiation part 140 to the heating chamber 101. The high-frequency power unit 330 detects a subcarrier wave output from the high-frequency power unit 330 to the radiation part 140 and a subcarrier wave flowing back from the radiation part 140 to the high-frequency power unit 330 and outputs an in-phase detection signal Det(I) and a quadrature detection signal Det(Q) to the demodulation part 380.

A detailed configuration of the high-frequency power unit 330 will be described.

As depicted in FIG. 12, the high-frequency power unit 330 further includes a distribution part 339 and a power detection part 390 as compared to the high-frequency power unit 130 of the first embodiment depicted in FIG. 1.

Figure 13:
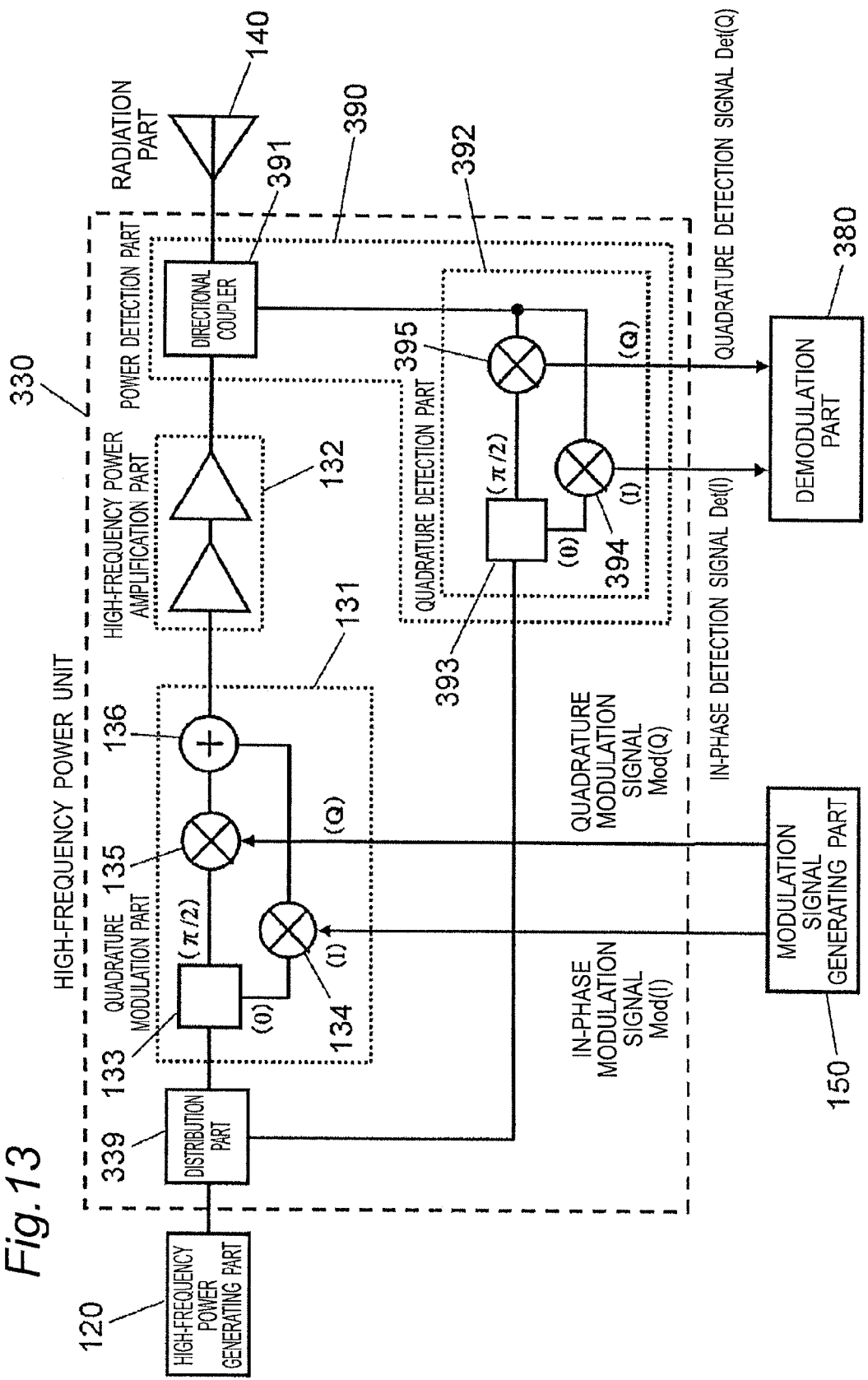
FIG. 13 is a block diagram of a specific configuration of a high-frequency power unit of the high-frequency heating device of the third embodiment according to the present invention.

FIG. 13 is a block diagram of a specific configuration of the high-frequency power unit 330. In FIG. 13, the high-frequency power generating part 120, the radiation part 140, the modulation signal generating part 150, and the demodulation part 380 are depicted.

The high-frequency power unit 330 further has the distribution part 339 and the power detection part 390 as compared to the high-frequency power unit 130 according to the first embodiment depicted in FIG. 3.

The distribution part 339 distributes the high-frequency power input from the high-frequency power generating part 120 and inputs the distributed high-frequency powers to the quadrature modulation part 131 and the power detection part 390. The distributing part 339 may be implemented by using a resistance distributor or by using either a directional coupler or a hybrid coupler.

The quadrature modulation part 131 generates a subcarrier wave by quadrature modulation of the high-frequency power input from the distribution part 339 with the in-phase modulation signal Mod(I) and the quadrature modulation signal Mod(Q) input from the modulation signal generating part 150 and outputs the subcarrier wave to the high-frequency power amplification part 132.

The high-frequency power amplification part 132 amplifies the subcarrier wave generated by the quadrature modulation part 131 at a predetermined amplification rate and outputs the subcarrier wave via the power detection part 390 to the radiation part 140.

Specific configurations and effects of the quadrature modulation parts 131 and the high-frequency power amplification part 132 are the same as the specific configurations and effects of the quadrature modulation part 131 and the high-frequency power amplification part 132 depicted in FIG. 3 described in the first embodiment and therefore will not be described.

The power detection part 390 has a directional coupler 391 and a quadrature detection part 392.

The directional coupler 391 branches a portion of the high-frequency power output from the high-frequency power amplification part 132 to the radiation part 140 or a portion of the high-frequency power flowing back from the radiation part 140 to the high-frequency power amplification part 132 to input the portion to the quadrature detection part 392 and outputs the high-frequency power amplified by the high-frequency power amplification part 132 to the radiation part 140. Therefore, the high-frequency power amplified by the high-frequency power amplification part 132 is radiated via the directional coupler 391 from the radiation part 140 to the heating chamber 101. The directional coupler 391 may be implemented by using a commonly used directional coupler or by using either a circulator or a hybrid coupler, for example.

The quadrature detection part 392 performs quadrature detection of the branched power input from the directional coupler 391 by using the high-frequency power input from the high-frequency power generating part 120 to detect the in-phase detection signal Det(I) and the quadrature detection signal Det(Q) for demodulating individual subcarrier waves. The quadrature detection part 392 has a $\pi/2$ phase shifter 393, an in-phase detection mixer 394, and a quadrature detection mixer 395 and each of the in-phase detection mixer 394 and the quadrature detection mixer 395 is connected to the demodulation part 380.

The high-frequency power distributed by the distribution part 399 is input to the $\pi/2$ phase shifter 393, which generates an in-phase high-frequency power in phase with the input high-frequency power, and a quadrature high-frequency power with the phase shifted by $\pi/2$. The in-phase high-frequency power is output to the in-phase detection mixer 394, and the quadrature high-frequency power is output to the quadrature detection mixer 395. Although not depicted in FIG. 13, a high-frequency power amplifier and a fixed attenuator as well as a low-pass filter may be disposed between the distribution part 399 and the quadrature detection part 392 for optimization of detection characteristics of the quadrature detection part 392.

On the other hand, the branched power branched by the directional coupler 391 is input to the quadrature detection part 392. The branched power input to the quadrature detection part 392 is distributed into two parts, which are respectively input to the in-phase detection mixer 394 and the quadrature detection mixer 395. Although not depicted, a high-frequency power amplifier and a fixed attenuator as well as a low-pass filter may be disposed between the directional coupler 391 and the quadrature detection part 392 for optimization of detection characteristics of the quadrature detection part 392.

The in-phase detection mixer 394 multiplies the branched power by the in-phase high-frequency power input from the $\pi/2$ phase shifter 393 to detect, i.e., synchronously detect, the branched power with the in-phase high-frequency power. As a result of this synchronous detection, i.e., as a result of the multiplication of the two input signals, the in-phase detection mixer 394 outputs the in-phase detection signal Det(I) to the demodulation part 380.

Similarly, the quadrature detection mixer 395 multiplies the branched power by the quadrature high-frequency power input from the $\pi/2$ phase shifter 393 to detect, i.e., synchronously detect, the branched power with the quadrature high-frequency power. As a result of this synchronous detection, i.e., as a result of the multiplication of the two input signals, the quadrature detection mixer 395 outputs the quadrature detection signal Det(Q) to the demodulation part 380.

Although not depicted, a low-pass filter may be disposed after each of the in-phase detection mixer 394 and the quadrature detection mixer 395 before the demodulation part 380 for optimization of detection characteristics of the quadrature detection part 392.

As described above, the high-frequency power unit 330 generates a subcarrier wave by quadrature modulation of the high-frequency power input from the high-frequency power generating part 120 with the in-phase modulation signal Mod(I) and the quadrature modulation signal Mod(Q) input from the modulation signal generating part 150 and radiates the subcarrier wave via the radiation part 140 into the heating chamber 101. The high-frequency power unit 330 detects a radiated power radiated into the heating chamber 101 or a backflow power flowing back from the heating chamber 101 to output to the demodulation part 380 the in-phase detection signal Det(I) and the quadrature detection signal Det(Q) for demodulating individual subcarrier waves of the radiated power or the backflow power.

The radiation part 140 is, for example, an antenna radiating the subcarrier wave generated by the high-frequency power unit 330 into the heating chamber 101. Although the radiation part 140 is depicted separately from the high-frequency power unit 330 in FIG. 12, this is merely an example and the radiation part 140 may be included in the high-frequency power unit 330.

The control part 310 controls frequencies and phases of a plurality of subcarrier waves radiated from the radiation part 140 into the heating chamber 101. Specifically, the control part 310 outputs to the high-frequency power generating part 120 the frequency control signal Cfreq of a reference frequency for generating a plurality of subcarrier waves used for heating in the high-frequency power unit 330.

The control part 310 outputs to the modulation signal generating part 150 the information of offset frequencies and phases relative to the reference frequency for individual subcarrier waves of a plurality of the subcarrier waves used for heating generated by the high-frequency power unit 330.

The control part 310 determines the frequencies and phases of the individual subcarrier waves optimal for heating based on the information of frequencies and vectors of the individual subcarrier waves input from the demodulation part 380.

The modulation signal generating part 150 generates the in-phase modulation signal Mod(I) and the quadrature modulation signal Mod(Q) from the information of offset frequencies and phases relative to the reference frequency for individual subcarrier waves of a plurality of subcarrier waves generated by the high-frequency power unit 330, which is input from the control part 310, and outputs the signals to the quadrature modulation part 131. Specific configuration of the modulation signal generating part 150 is the same as the specific configuration of the modulation signal generating part 150 depicted in FIG. 4 described in the first embodiment and therefore will not be described in the third embodiment.

The demodulation part 380 demodulates the in-phase detection signal Det(I) and the quadrature detection signal Det(Q) generated by the quadrature detection of the branched power of the radiated power or the backflow power and input from the quadrature detection part 392. The demodulation part 380 detects information of frequencies and vectors of individual subcarrier waves in the branched power of the radiated power or the backflow power and inputs to the control part 310 the detected information of frequencies and vectors of individual subcarrier waves in the branched power of the radiated power or the backflow power.

Figure 14:
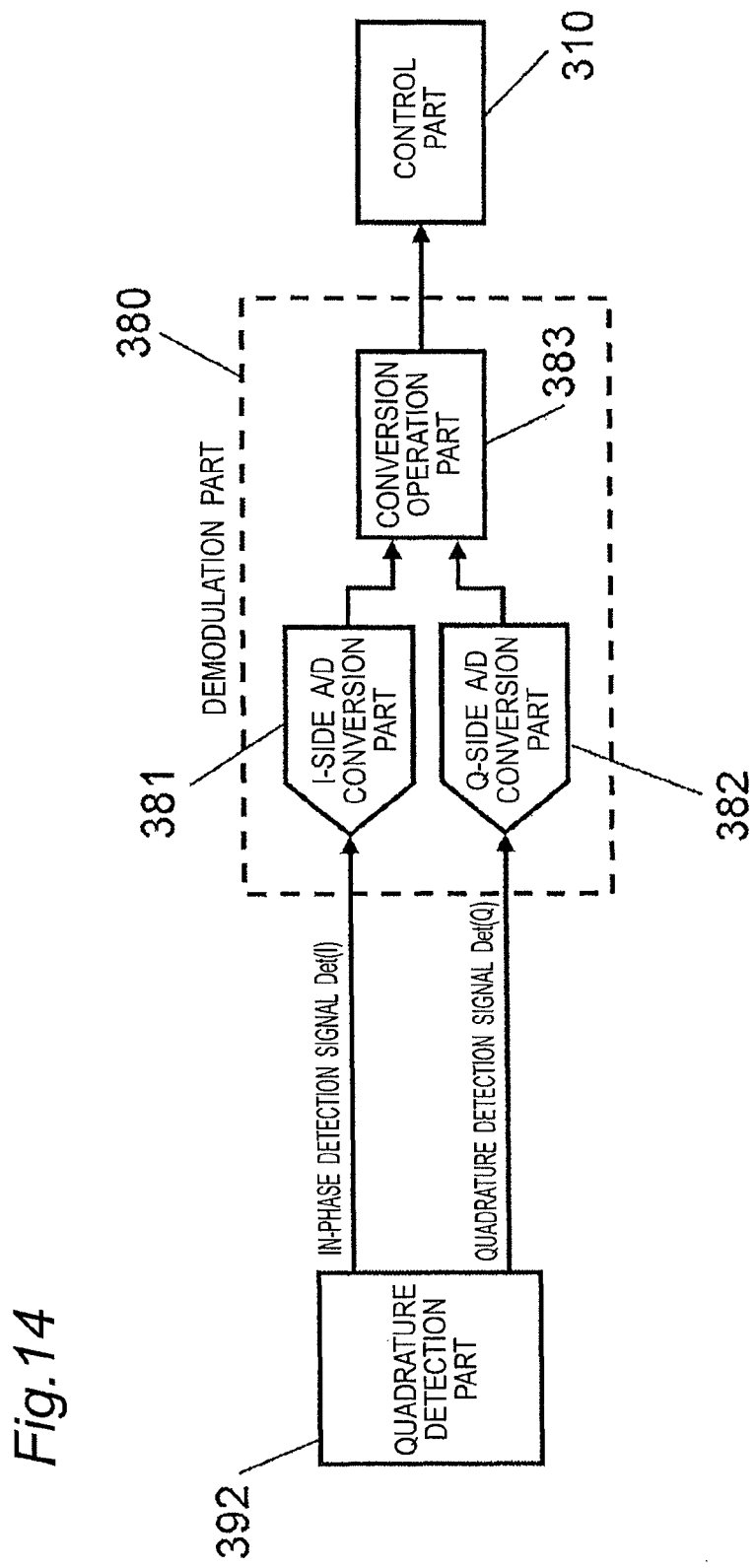
FIG. 14 is a block diagram of a specific configuration of a demodulation part of the high-frequency heating device of the third embodiment according to the present invention.

FIG. 14 is a block diagram of a specific configuration of the demodulation part 380. In FIG. 14, the control part 310 and the quadrature detection part 392 are depicted.

As depicted in FIG. 14, the demodulation part 380 has an I-side A/D conversion part 381, a Q-side A/D conversion part 382, and a conversion operation part 383.

The I-side A/D conversion part 381 performs analog-digital conversion of the in-phase detection signal Det(I) input from the quadrature detection part 392 and outputs the in-phase detection signal converted into a digital signal to the conversion operation part 383.

Similarly, the Q-side A/D conversion part 382 performs analog-digital conversion of the quadrature detection signal Det(Q) input from the quadrature detection part 392 and outputs the quadrature detection signal converted into a digital signal to the conversion operation part 383.

In FIG. 14, the I-side A/D conversion part 381 and the Q-side A/D conversion part 382 are depicted as one of the constituent elements of the demodulation part 380; however, this is a merely an example, and the I-side A/D conversion part 381 and the Q-side A/D conversion part 382 may be disposed between the quadrature detection part 392 and the demodulation part 380 or may be included in the quadrature detection part 392.

The conversion operation part 383 performs the discrete Fourier transform (DFT) of the in-phase detection signal and the quadrature detection signal input from the I-side A/D conversion part 381 and the Q-side A/D conversion part 382 for conversion into data strings in the frequency domain, thereby detecting information of frequencies and vectors of individual subcarrier waves, and outputs the detected information of frequencies and vectors of individual subcarrier waves to the control part 310. For the operation of DFT, the fast Fourier transform (FFT) can be used. This enables high-speed arithmetic processing with a small circuit scale, which is effective for miniaturization and cost reduction of the device.

As described above, the demodulation part 380 demodulates the in-phase detection signal Det(I) and the quadrature detection signal Det(Q) generated by the quadrature detection of the branched power of the radiated power or the backflow power and input from the quadrature detection part 392, detects the information of frequencies and vectors of individual subcarrier waves of the branched power of the radiated power or the backflow power, and outputs the detected information of frequencies and vectors of individual subcarrier waves of the branched power of the radiated power or the backflow power to the control part 310.

An operation of the high-frequency heating device 300 of the third embodiment will be described.

Figure 15:
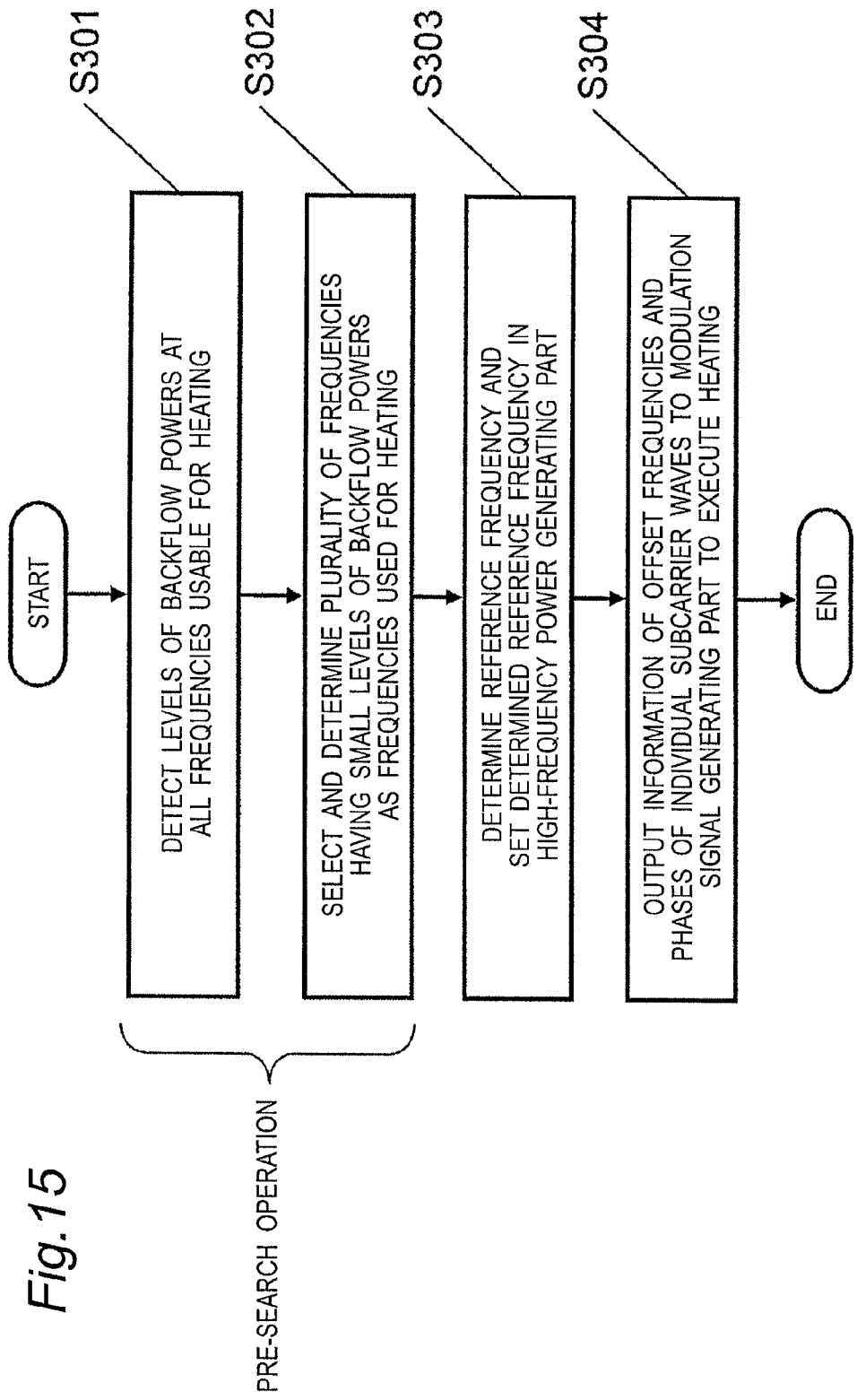
FIG. 15 is a flowchart of a control procedure of the high-frequency heating device of the third embodiment according to the present invention.

FIG. 15 is a flowchart of a control procedure of the high-frequency heating device 300 of the third embodiment depicted in FIG. 12. The high-frequency heating device 300 of FIG. 12 executes the following processes in the control part 310.

First, the control part 310 detects levels of backflow powers at all the frequencies usable for heating (step S301). Specifically, the control part 310 defines frequencies usable for heating as frequencies of subcarrier waves and inputs information of frequencies of subcarrier waves to the modulation signal generating part 150, and the subcarrier waves are generate in the high-frequency power unit 330 and output to the radiation part 140. In this case, the control part 310 detects levels of backflow power at the frequencies of individual subcarrier waves by using frequencies and vector information of the individual subcarrier waves of the backflow power input from the demodulation part 380 as a result of the backflow power flowing back from the radiation part 140 to the high-frequency power unit 330 detected by the power detection part 390.

Description will be made of a method of detecting levels and phases of individual subcarrier waves from the vector information of the individual subcarrier waves input from the demodulation part 380.

Vector information of a signal with a magnitude and a phase is generally represented by orthogonal coordinates. Description will be made of a method of detecting levels and phases of individual subcarrier waves from the vector information of the individual subcarrier waves when the vector information of the subcarrier waves is represented by orthogonal coordinates with reference to the figure.

Figure 16:
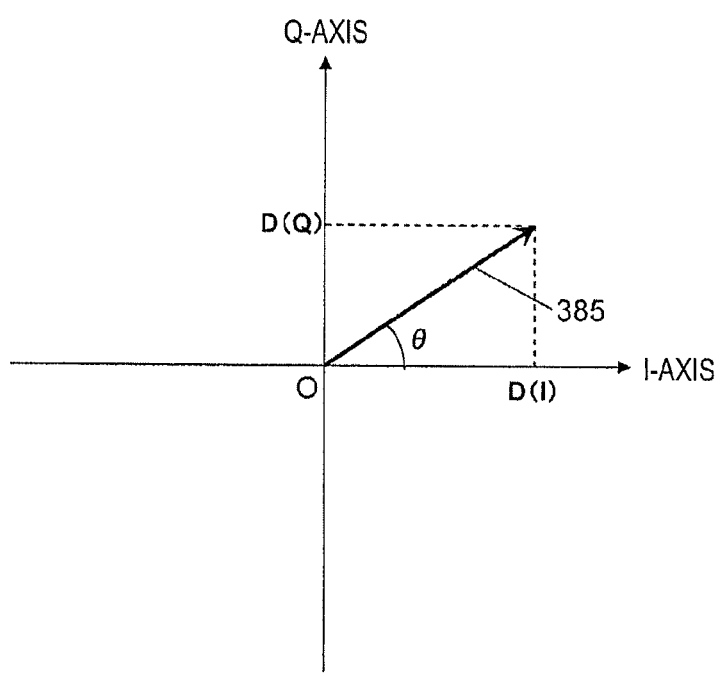
FIG. 16 is an explanatory view of a method of detecting a level and a phase from vector information of the high-frequency heating device of the third embodiment according to the present invention.

FIG. 16 is a diagram of vector information of one subcarrier wave of individual subcarrier waves of backflow power input from the demodulation part 380 represented by orthogonal coordinates. In FIG. 16, the vertical axis is a Q-axis and the horizontal axis is an I-axis. As depicted in FIG. 16, the level and the phase of the subcarrier wave are indicated by one vector 385. A length of an arrow of the vector 385 represents the level, and an angle θ of the arrow represents the phase.

The vector 385 indicative of the level and the phase of the subcarrier wave is indicated as vector information by a coordinate value D(I) on the I-axis and a coordinate value D(Q) on the Q-axis. The coordinate value D(I) on the I-axis and the coordinate value D(Q) on the Q-axis may hereinafter be referred to as the coordinate value D(I) and the coordinate value D(Q).

For the coordinate value D(I) and the coordinate value D(Q), the intersection of the I-axis and the O-axis is defined as the origin O, which is set to zero, and the coordinate value D(I) is indicated by a signed numeric value that is positive on the right side from the origin O and negative on the left side from the origin O. On the other hand, the coordinate value D(Q) is indicated by a signed numeric value that is positive on the upper side from the origin O and negative on the lower side from the origin O.

From the coordinate value D(I) and the coordinate value D(Q), the level and the phase of the subcarrier wave can be obtained by calculation. Specifically, the level is calculated from the mean square of the coordinate value D(I) and the coordinate value D(Q), and the phase is calculated from the arctangent ($\tan^{-1}$) of a value acquired by dividing the coordinate value D(I) by the coordinate value D(Q).

In the same way, from the vector information of individual subcarrier waves of the backflow power input from the demodulation part 380, the levels and the phases of all the subcarrier waves are individually detected.

A method of detecting the levels of backflow powers at all the frequencies usable for heating will be described.

The method of detecting the levels of backflow powers at all the frequencies usable for heating may be (1) a method of defining all the frequencies usable for heating as frequencies of subcarrier waves, generating subcarrier waves of all the frequencies usable for heating by the high-frequency power unit 330, and detecting the levels of backflow powers of the subcarrier waves of all the frequencies usable for heating by detecting the backflow powers once; and (2) a method of dividing the frequencies usable for heating into at least two groups, first defining the frequencies included in a first group as frequencies of subcarrier waves, generating subcarrier waves of the frequencies included in the first group by the high-frequency power unit 330, detecting the backflow power to detect the levels of backflow power of the subcarrier waves of the frequencies included in the first group, then defining the frequencies included in a second group as frequencies of subcarrier waves, generating subcarrier waves of the frequencies included in the second group by the high-frequency power unit 330, detecting the backflow power to detect the levels of backflow power of the subcarrier waves of the frequencies included in the second group, and repeatedly performing this operation for all the groups divided by the grouping so as to detect the levels of backflow power of the subcarrier waves of all the frequencies usable for heating.

According to the method (1), the levels of backflow power at all the frequencies usable for heating can be detected by detecting the backflow powers once and, therefore, step S301 can be executed in a very short time. In this case, the reference frequency set in the high-frequency power generating part 120 is preferably determined as a frequency in the middle between the lowest and highest frequencies usable for heating. For example, if the frequencies usable for heating range from 2400 MHz to 2500 MHz, the reference frequency is preferably determined as 2450 MHz.

On the other hand, according to the method (2), the frequencies usable for heating are divided into multiple groups to detect the backflow powers at the frequencies included in the groups in order for each group and, therefore, the backflow power detection operation must be performed the number of times same as the number of groups, requiring a longer time for executing step S301 as compared to the method (1) described above. However, in this case, the reference frequency set in the high-frequency power generating part 120 is preferably determined for each of the groups as a frequency in the middle between the lowest and highest frequencies of the frequencies included in each of the groups. Therefore, the reference frequency set in the high-frequency power generating part 120 is set to a different frequency for each of the groups. Thus, as compared to the method (1), absolute values of the offset frequencies of the individual subcarrier waves can be made smaller that are input to the modulation signal generating part 150 for generating the subcarrier waves of the frequencies included in each of the groups by the high-frequency power unit 330. As a result, a signal band of the in-phase modulation signal Mod(I) and the quadrature modulation signal Mod(Q) generated by the modulation signal generating part 150 can be narrowed and a load of a circuit making up the modulation signal generating part 150 can be reduced. A load of a signal transmission circuit between the modulation signal generating part 150 and the quadrature modulation part 131 can also be reduced and this contributes to miniaturization and cost reduction as well as an improvement in reliability of the circuit.

After detecting the levels of backflow powers at all the frequencies usable for heating as described above at step S301, the control part 310 selects a plurality of frequencies having small levels of backflow powers out of all the frequencies usable for heating to determine the selected frequencies as the frequencies used for heating (step S302). Specifically, the control part 310 determines the frequencies used for heating based on the values of levels of backflow powers at all the frequencies usable for heating detected at step S301. In this case, a method of determining the frequencies used for heating may be (1) a method of setting a threshold value of the level value of the backflow power in advance to determine frequency points having a value of the level of the detected backflow power smaller than the threshold value as the frequencies used for heating; and (2) a method of determining a plurality of (e.g., three) frequency points in ascending order of the value of the level of the detected backflow power as the frequencies used for heating.

The operations of steps S301 and S302 described above are the preprocessing of heating operation for determining the frequencies used for heating before performing the heating and, therefore, a sequence of operations from the start of operation of step S301 to the end of operation of step S302 will hereinafter be referred to as a pre-search operation.

After the frequencies used for heating are determined at step S302, the reference frequency is determined and the determined reference frequency is set in the high-frequency power generating part 120 (step S303). Specifically, the control part 310 determines the frequency of the high-frequency power supplied from the high-frequency power generating part 120 to the quadrature modulation part 131 as the reference frequency and outputs to the high-frequency power generating part 120 the frequency control signal Cfrq for causing the high-frequency power generating part 120 to output the high-frequency power of the reference frequency. Although this reference frequency can be determined as any frequency within a range of frequency of the high-frequency power that can be generated by the high-frequency power generating part 120, the reference frequency is preferably determined as the center frequency between the lowest and highest frequencies of the frequencies used for heating determined at step S302.

Lastly, the control part 310 outputs the information of offset frequencies and phases of individual subcarrier waves used for heating to the modulation signal generating part 150 to execute a heating treatment (step S304). Specifically, the control part 310 determines the offset frequencies of the individual subcarrier waves based on the frequencies of the individual subcarrier waves used for heating determined at step S302 and the reference frequency determined at step S303. More specifically, frequency differences between the reference frequency determined at step S303 and the frequencies of the individual subcarrier waves determined at step S302 are defined as the offset frequencies of the individual subcarrier waves. By outputting the information of the offset frequencies and phases of the individual subcarrier waves determined in this way to the modulation signal generating part 150, the modulation signal generating part 150 generates the in-phase modulation signal Mod(I) and the quadrature modulation signal Mod(Q), and a plurality of the subcarrier waves determined at step S302 is generated by the quadrature modulation part 131 and radiated via the high-frequency power amplification part 132 and the radiation part 140 into the heating chamber 101 to execute the heating treatment.

According to the configuration of the high-frequency power unit 330 of the third embodiment, a plurality of subcarrier waves radiated from the radiation part 140 to the heating chamber 101 and a plurality of subcarrier waves flowing back from the heating chamber 101 to the radiation part 140 can be detected for each of the individual subcarrier waves. Therefore, the pre-search operation can be performed before executing the heating so as to comprehend efficiency for each of the individual subcarrier waves and to select highly efficient frequencies. As a result, the high-frequency heating device 300 of the third embodiment can provide various types of heating region control with higher efficiency.

(Fourth Embodiment)

A high-frequency heating device of a fourth embodiment according to the present invention will hereinafter be described with reference to the accompanying drawings. While the high-frequency heating device 300 of the third embodiment has one set of the high-frequency power unit 330, the radiation part 140, the modulation signal generating part 150, and the demodulation part 380, the high-frequency heating device of the fourth embodiment has at least two sets of high-frequency power units, radiation parts, modulation signal generating parts, and demodulation parts, and this is a difference from the high-frequency heating device 300 of the third embodiment. With this configuration, the high-frequency heating device of the fourth embodiment can radiate the high-frequency powers at pluralities of respective frequencies and phases from a plurality of the radiation parts and can detect a plurality of subcarrier waves radiated from the respective radiation parts to the heating chamber 101 and a plurality of subcarrier waves flowing back from the heating chamber 101 to the respective radiation parts for respective individual subcarrier waves for each of the radiation parts. Therefore, the high-frequency heating device of the fourth embodiment can comprehend efficiency of the individual subcarrier waves for each of the radiation parts and can provide various types of heating region control with higher efficiency.

The high-frequency heating device of the fourth embodiment will hereinafter be described mainly in terms of differences from the third embodiment. In the description of the fourth embodiment, the constituent elements having the same functions as the second and third embodiments are denoted by the same reference numerals and will not be described. Contents having the same effects as the second and third embodiments will not be described.

Figure 17:
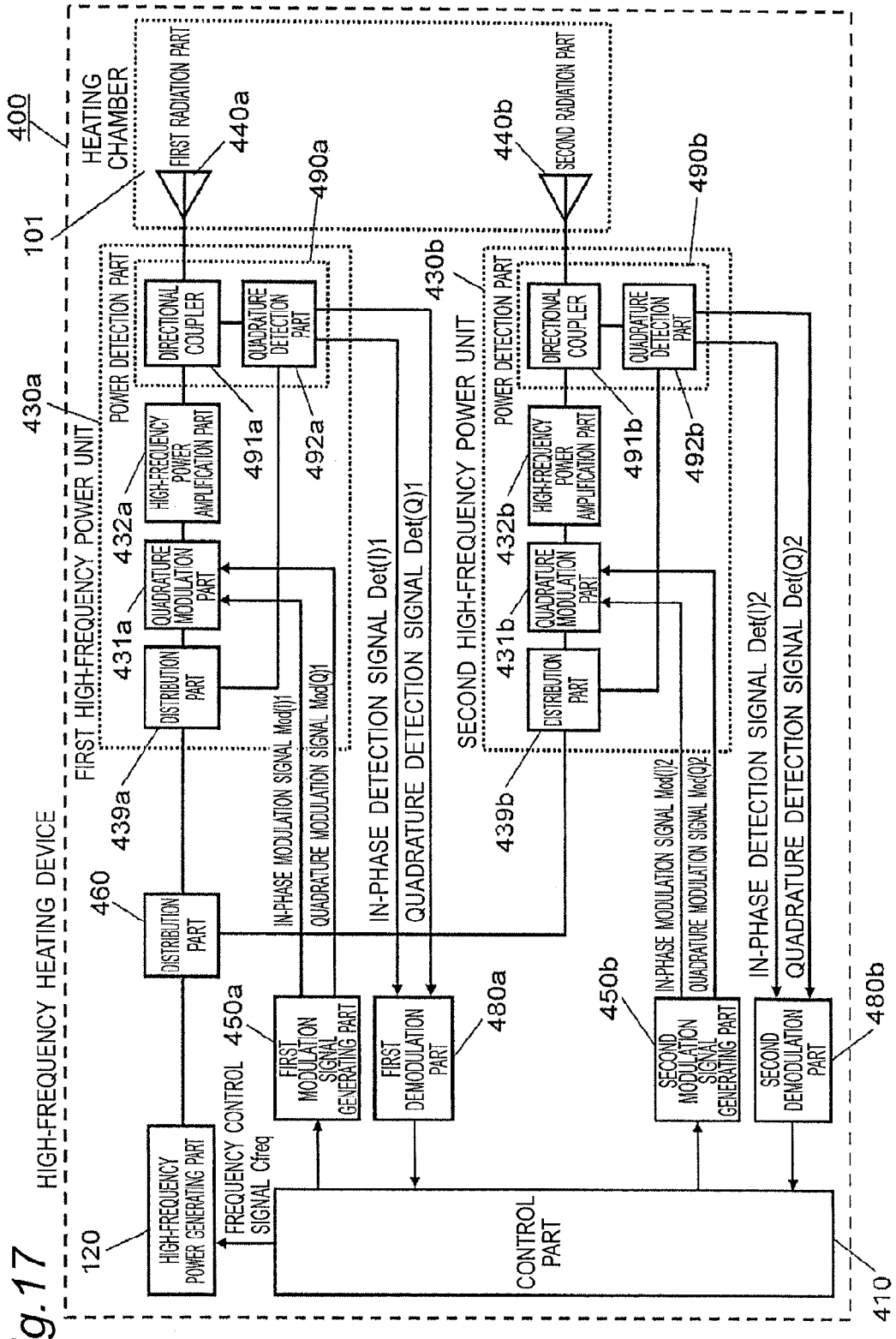
FIG. 17 is a block diagram of a basic configuration of a high-frequency heating device of a fourth embodiment according to the present invention.

FIG. 17 is a block diagram of a configuration of the high-frequency heating device of the fourth embodiment according to the present invention.

As compared to the high-frequency heating device 300 of the third embodiment depicted in FIG. 12, a high-frequency heating device 400 depicted in FIG. 17 includes a first high-frequency power unit 430*a* and a second high-frequency power unit 430*b* instead of the high-frequency power unit 330, includes a first radiation part 440*a* and a second radiation part 440*b* instead of the radiation part 140, includes a first modulation signal generating part 450*a* and a second modulation signal generating part 450*b* instead of the modulation signal generating part 150, includes a first demodulation part 480*a* and a second demodulation part 480*b* instead of the demodulation part 380, includes a control part 410 instead of the control part 310, and further includes a distribution part 460.

The high-frequency power generating part 120 generates a high-frequency power having a frequency set by the frequency control signal Cfreq input from the control part 410. The generated high-frequency power is distributed by the distribution part 460 and input to the first high-frequency power unit 430*a* and the second high-frequency power unit 430*b*. Therefore, the high-frequency power generating part 120 supplies the high-frequency power to the first high-frequency power unit 430*a* and the second high-frequency power unit 430*b*.

The first high-frequency power unit 430*a* radiates a subcarrier wave generated by quadrature modulation of the high-frequency power input from the distribution part 460 with the in-phase modulation signal Mod(I)1 and the quadrature modulation signal Mod(Q)1 input from the first modulation signal generating part 450*a*, via the first radiation part 440*a* to the heating chamber 101. The second high-frequency power unit 430*b* radiates a subcarrier wave generated by quadrature modulation of the high-frequency power input from the distribution part 460 with the in-phase modulation signal Mod(I)2 and the quadrature modulation signal Mod(Q)2 input from the second modulation signal generating part 450*b*, via the second radiation part 440*b* to the heating chamber 101.

The first high-frequency power unit 430*a* detects a subcarrier wave output from the first high-frequency power unit 430*a* to the first radiation part 440*a* and a subcarrier wave flowing back from the first radiation part 440*a* to the first high-frequency power unit 430*a* and outputs an in-phase detection signal Det(I)1 and a quadrature detection signal Det(Q)1 to the first demodulation part 480*a*. The second high-frequency power unit 430*b* detects a subcarrier wave output from the second high-frequency power unit 430*b* to the second radiation part 440*b* and a subcarrier wave flowing back from the second radiation part 440*b* to the second high-frequency power unit 430*b* and outputs an in-phase detection signal Det(I)2 and a quadrature detection signal Det(Q)2 to the second demodulation part 480b.

The first high-frequency power unit 430a has a distribution part 439a, a quadrature modulation part 431a, a high-frequency power amplification part 432a, and a power detection part 490a. The second high-frequency power unit 430b has a distribution part 439b, a quadrature modulation part 431b, a high-frequency power amplification part 432b, and a power detection part 490b.

The distribution part 439a distributes the high-frequency power input from the distribution part 460 and inputs the distributed high-frequency powers to the quadrature modulation part 431a and the power detection part 490a. The distribution part 439b distributes the high-frequency power input from the distribution part 460 and inputs the distributed high-frequency powers to the quadrature modulation part 431b and the power detection part 490b. The distributing parts 439a and 439b may be implemented by using resistance distributors or by using either directional couplers or hybrid couplers.

The quadrature modulation part 431a generates a subcarrier wave by quadrature modulation of the high-frequency power input from the distribution part 439a with the in-phase modulation signal Mod(I)1 and the quadrature modulation signal Mod(Q)1 input from the first modulation signal generating part 450a and outputs the subcarrier wave to the high-frequency power amplification part 432a. The quadrature modulation part 431b generates a subcarrier wave by quadrature modulation of the high-frequency power input from the distribution part 439b with the in-phase modulation signal Mod(I)2 and the quadrature modulation signal Mod(Q)2 input from the second modulation signal generating part 450b and outputs the subcarrier wave to the high-frequency power amplification part 432b.

The high-frequency power amplification part 432a amplifies the subcarrier wave generated by the quadrature modulation part 431a at a predetermined amplification rate and outputs the subcarrier wave to the first radiation part 440a. The high-frequency power amplification part 432b amplifies the subcarrier wave generated by the quadrature modulation part 431b at a predetermined amplification rate and outputs the subcarrier wave to the second radiation part 440b.

Specific configurations of the quadrature modulation parts 431a and 431b and the high-frequency power amplification parts 432a and 432b are the same as the specific configurations of the quadrature modulation part 131 and the high-frequency power amplification part 132 depicted in FIG. 3 described in the first embodiment and therefore will not be described.

The power detection part 490a has a directional coupler 491a and a quadrature detection part 492a. The power detection part 490b has a directional coupler 491b and a quadrature detection part 492b.

The directional coupler 491a branches a portion of the high-frequency power output from the high-frequency power amplification part 432a to the first radiation part 440a or a portion of the high-frequency power flowing back from the first radiation part 440a to the high-frequency power amplification part 432a to input the portion to the quadrature detection part 492a and outputs the high-frequency power amplified by the high-frequency power amplification part 432a to the first radiation part 440a. Therefore, the high-frequency power amplified by the high-frequency power amplification part 432a is radiated via the directional coupler 491a from the first radiation part 440a to the heating chamber 101. The directional coupler 491b branches a portion of the high-frequency power output from the high-frequency power amplification part 432b to the second radiation part 440b or a portion of the high-frequency power flowing back from the second radiation part 440b to the high-frequency power amplification part 432b to input the portion to the quadrature detection part 492b and outputs the high-frequency power amplified by the high-frequency power amplification part 432b to the second radiation part 440b. Therefore, the high-frequency power amplified by the high-frequency power amplification part 432b is radiated via the directional coupler 491b from the second radiation part 440b to the heating chamber 101. The directional couplers 491a and 491b may be implemented by using commonly used directional couplers or by using either circulators or hybrid couplers, for example.

The quadrature detection part 492a performs quadrature detection of the branched power input from the directional coupler 491a by using the high-frequency power input from the distribution part 439a to detect the in-phase detection signal Det(I)1 and the quadrature detection signal Det(Q)1 for demodulating individual subcarrier waves. The quadrature detection part 492a outputs the detected in-phase and quadrature detection signals Det(I)1 and Det(Q)1 to the first demodulation part 480a. The quadrature detection part 492b performs quadrature detection of the branched power input from the directional coupler 491b by using the high-frequency power input from the distribution part 439b to detect the in-phase detection signal Det(I)2 and the quadrature detection signal Det(Q)2 for demodulating individual subcarrier waves. The quadrature detection part 492b outputs the detected in-phase and quadrature detection signals Det(I)2 and Det(Q)2 to the second demodulation part 480b.

Specific configurations of the quadrature detection parts 492a and 492b are the same as the specific configuration of the quadrature detection part 392 depicted in FIG. 13 described in the third embodiment and therefore will not be described.

As described above, the first high-frequency power unit 430a generates a subcarrier wave by quadrature modulation of the high-frequency power input from the distribution part 460 with the in-phase modulation signal Mod(I)1 and the quadrature modulation signal Mod(Q)1 input from the first modulation signal generating part 450a and radiates the subcarrier wave via the first radiation part 440a into the heating chamber 101. The first high-frequency power unit 430a detects a radiated power radiated into the heating chamber 101 or a backflow power flowing back from the heating chamber 101 to output to the first demodulation part 480a the in-phase detection signal Det(I)1 and the quadrature detection signal Det(Q)1 for demodulating individual subcarrier waves of the radiated power or the backflow power.

The second high-frequency power unit 430b generates a subcarrier wave by quadrature modulation of the high-frequency power input from the distribution part 460 with the in-phase modulation signal Mod(I)2 and the quadrature modulation signal Mod(Q)2 input from the second modulation signal generating part 450b and radiates the subcarrier wave via the second radiation part 440b into the heating chamber 101. The second high-frequency power unit 430b detects a radiated power radiated into the heating chamber 101 or a backflow power flowing back from the heating chamber 101 to output to the second demodulation part 480b the in-phase detection signal Det(I)2 and the quadrature detection signal Det(Q)2 for demodulating individual subcarrier waves of the radiated power or the backflow power.

The first radiation part 440a and the second radiation part 440b are, for example, antennas radiating the respective subcarrier waves generated by the first high-frequency power unit 430a and the second high-frequency power unit 430b to the heating chamber 101. Although the first radiation part 440a and the second radiation part 440b are depicted separately from the first high-frequency power unit 430a and the second high-frequency power unit 430b in FIG. 17, this is merely an example and the first radiation part 440a and the second radiation part 440b may be included in the first high-frequency power unit 430a and the second high-frequency power unit 430b.

The control part 410 controls frequencies and phases of a plurality of subcarrier waves radiated from each of the first radiation part 440a and the second radiation part 440b. Specifically, the control part 410 outputs to the high-frequency power generating part 120 the frequency control signal Cfreq of a reference frequency for generating a plurality of subcarrier waves used for heating in the first high-frequency power unit 430a and the second high-frequency power unit 430b.

The control part 410 outputs to the first modulation signal generating part 450a the information of offset frequencies and phases relative to the reference frequency for individual subcarrier waves of a plurality of the subcarrier waves generated by the first high-frequency power unit 430a, and outputs to the second modulation signal generating part 450b the information of offset frequencies and phases relative to the reference frequency for individual subcarrier waves of a plurality of the subcarrier waves generated by the second high-frequency power unit 430b.

The first modulation signal generating part 450a generates the in-phase modulation signal Mod(I)1 and the quadrature modulation signal Mod(Q)1 from the information of offset frequencies and phases relative to the reference frequency for individual subcarrier waves of a plurality of subcarrier waves generated by the first high-frequency power unit 430a input from the control part 410, and outputs the signals to the quadrature modulation part 431a. The second modulation signal generating part 450b generates the in-phase modulation signal Mod(I)2 and the quadrature modulation signal Mod(Q)2 from the information of offset frequencies and phases relative to the reference frequency for individual subcarrier waves of a plurality of subcarrier waves generated by the second high-frequency power unit 430b input from the control part 410, and outputs the signals to the quadrature modulation part 431b.

Specific configurations of the first modulation signal generating part 450a and the second modulation signal generating part 450b are the same as the specific configuration of the modulation signal generating part 150 depicted in FIG. 4 described in the first embodiment and therefore will not be described.

The distributing part 460 distributes the high-frequency power input from the high-frequency power generating part 120 into two parts and inputs the respective distributed high-frequency powers to the first high-frequency power unit 430a and the second high-frequency power unit 430b. The distributing part 460 may be implemented by using a resistance distributor or by using either a directional coupler or a hybrid coupler.

As compared to the control part 310 depicted in FIG. 12, the control part 410 outputs to the two modulation signal generating parts, i.e., the first modulation signal generating part 450a and the second modulation signal generating part 450b, the information of offset frequencies and phases relative to the reference frequency for individual subcarrier waves of a plurality of the subcarrier waves generated by the first high-frequency power unit 430a and the information of offset frequencies and phases relative to the reference frequency for individual subcarrier waves of a plurality of the subcarrier waves generated by the second high-frequency power unit 430b. As a result, the control part 410 sets the individual frequencies and phases of a plurality of subcarrier waves generated by the first high-frequency power unit 430a and the frequencies and phases of individual subcarrier waves of a plurality of subcarrier waves generated by the second high-frequency power unit 430b independently of each other.

The first demodulation part 480a demodulates the in-phase detection signal Det(I)1 and the quadrature detection signal Det(Q)1 that are generated by the quadrature detection of the branched power of the radiated power radiated from the first radiation part 440a into the heating chamber 101 or the backflow power flowing back from the heating chamber 101 to the first radiation part 440a and that are input from the quadrature detection part 492a, and detects the information of frequencies and vectors of individual subcarrier waves of the branched power of the radiated power radiated from the first radiation part 440a into the heating chamber 101 or the backflow power flowing back from the heating chamber 101 to the first radiation part 440a. The first demodulation part 480a inputs to the control part 410 the detected information of frequencies and vectors of individual subcarrier waves of the branched power of the radiated power radiated from the first radiation part 440a into the heating chamber 101 or the backflow power flowing back from the heating chamber 101 to the first radiation part 440a.

The second demodulation part 480b demodulates the in-phase detection signal Det(I)2 and the quadrature detection signal Det(Q)2 that are generated by the quadrature detection of the branched power of the radiated power radiated from the second radiation part 440b into the heating chamber 101 or the backflow power flowing back from the heating chamber 101 to the second radiation part 440b and that are input from the quadrature detection part 492b, and detects the information of frequencies and vectors of individual subcarrier waves of the branched power of the radiated power radiated from the second radiation part 440b into the heating chamber 101 or the backflow power flowing back from the heating chamber 101 to the second radiation part 440b. The second demodulation part 480b inputs to the control part 410 the detected information of frequencies and vectors of individual subcarrier waves of the branched power of the radiated power radiated from the second radiation part 440b into the heating chamber 101 or the backflow power flowing back from the heating chamber 101 to the second radiation part 440b.

Specific configurations of the first demodulation part 480a and the second demodulation part 480b are the same as the specific configuration of the demodulation part 380 depicted in FIG. 14 described in the third embodiment and therefore will not be described.

An operation of the high-frequency heating device 400 of the fourth embodiment will be described.

Figure 18:
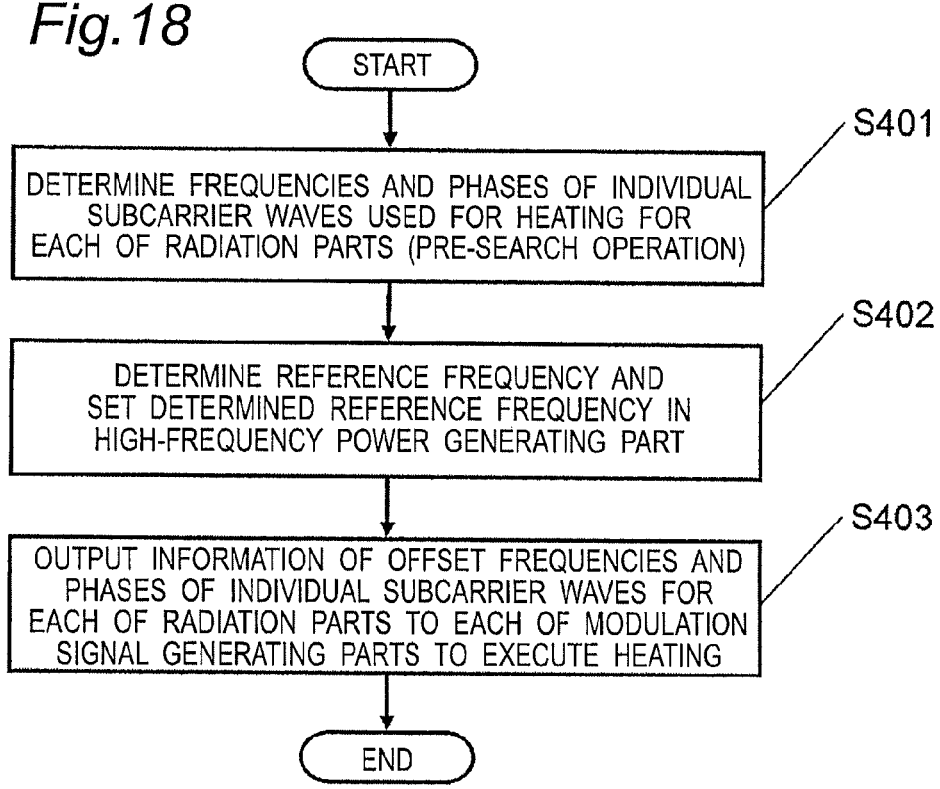
FIG. 18 is a flowchart of a control procedure of the high-frequency heating device of the fourth embodiment according to the present invention.

FIG. 18 is a flowchart of a basic control procedure of the high-frequency heating device 400 of the forth embodiment depicted in FIG. 17. The high-frequency heating device 400 of FIG. 17 executes the following processes in the control part 410.

First, the control part 410 determines frequencies and phases of individual subcarrier waves used for heating for each of the radiation parts (step S401). At step 401, the control part 410 determines the frequencies and phases of individual subcarrier waves used for heating generated by the first high-frequency power unit 430a and radiated from the first radiation part 440a and the frequencies and phases of individual subcarrier waves used for heating generated by the second high-frequency power unit 430b and radiated from the second radiation part 440b, before executing the heating. In other words, the pre-search operation is performed. A specific control method of the pre-search operation will be described later.

After performing the pre-search operation to determine the frequencies and phases of individual subcarrier waves used for heating generated by the first high-frequency power unit 430a and radiated from the first radiation part 440a and the frequencies and phases of individual subcarrier waves used for heating generated by the second high-frequency power unit 430b and radiated from the second radiation part 440b at step S401, the reference frequency is determined at step S402. At step S402, the determined reference frequency is set in the high-frequency power generating part 120 (step S402). Specifically, the control part 410 determines as the reference frequency the frequency of the high-frequency power supplied from the high-frequency power generating part 120 to the first high-frequency power unit 430a and the second high-frequency power unit 430b and outputs to the high-frequency power generating part 120 the frequency control signal Cfrq for causing the high-frequency power generating part 120 to output the high-frequency power of the reference frequency. Although this reference frequency can be determined as any frequency within a range of frequency of the high-frequency power that can be generated by the high-frequency power generating part 120, the reference frequency is preferably determined as the center frequency between the lowest and highest frequencies of the frequencies of individual subcarrier waves used for heating generated by the first high-frequency power unit 430a and radiated from the first radiation part 440a and the frequencies of individual subcarrier waves used for heating generated by the second high-frequency power unit 430b and radiated from the second radiation part 440b determined by the pre-search operation (step S401).

Lastly, the control part 410 outputs to the first modulation signal generating part 450a the information of offset frequencies and phases of individual subcarrier waves used for heating generated by the first high-frequency power unit 430a and radiated from the first radiation part 440a, and outputs to the second modulation signal generating part 450b the information of offset frequencies and phases of individual subcarrier waves used for heating generated by the second high-frequency power unit 430b and radiated from the second radiation part 440b, to execute a heating treatment (step S403). Specifically, the control part 410 determines the offset frequencies of the individual subcarrier waves based on the frequencies of individual subcarrier waves used for heating generated by the first high-frequency power unit 430a and radiated from the first radiation part 440a and the frequencies of individual subcarrier waves used for heating generated by the second high-frequency power unit 430b and radiated from the second radiation part 440b determined by the pre-search operation (step S401), and the reference frequency determined at step S402. More specifically, frequency differences between the reference frequency determined at step S402 and the frequencies of the individual subcarrier waves determined by the pre-search operation (step S401) are defined as the offset frequencies of the individual subcarrier waves.

By outputting the information of the offset frequencies and phases of the individual subcarrier waves generated by the first high-frequency power unit 430a and radiated from the first radiation part 440a determined as described above to the first modulation signal generating part 450a, the first modulation signal generating part 450a generates the in-phase modulation signal Mod(I)1 and the quadrature modulation signal Mod(Q)1, and the quadrature modulation part 431a generates a plurality of the subcarrier waves generated by the first high-frequency power unit 430a and radiated from the first radiation part 440a determined by the pre-search operation (step S401). A plurality of the generated subcarrier waves is radiated via the high-frequency power amplification part 432a and the first radiation part 440a into the heating chamber 101.

By outputting the information of the offset frequencies and phases of the individual subcarrier waves generated by the second high-frequency power unit 430b and radiated from the second radiation part 440b to the second modulation signal generating part 450b, the second modulation signal generating part 450b generates the in-phase modulation signal Mod(I)2 and the quadrature modulation signal Mod(Q)2, and the quadrature modulation part 431b generates a plurality of the subcarrier waves generated by the second high-frequency power unit 430b and radiated from the second radiation part 440b determined by the pre-search operation (step S401). A plurality of the generated subcarrier waves is radiated via the second high-frequency power amplification part 432b and the second radiation part 440b into the heating chamber 101. As a result, a plurality of the subcarrier waves is radiated via the first radiation part 440a and the second radiation part 440b into the heating chamber 101 to execute the heating treatment.

An example of a specific control procedure of the pre-search operation (step S401) will be described.

Figure 19:
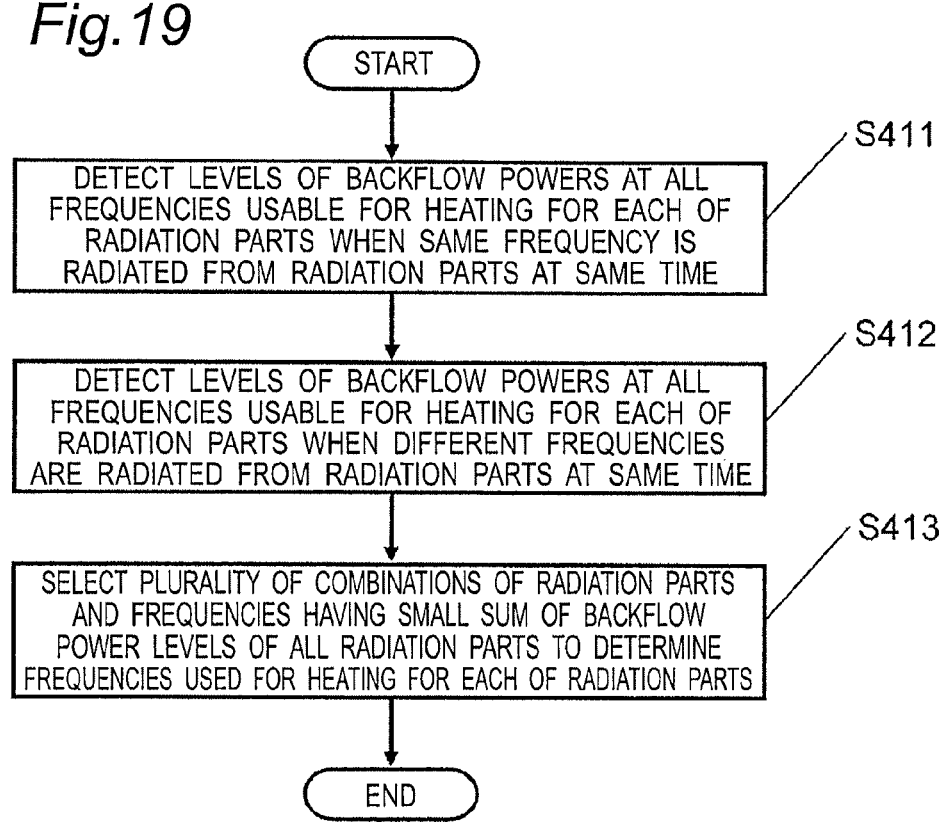
FIG. 19 is a flowchart of a first control procedure of a pre-search operation in the fourth embodiment according to the present invention.

FIG. 19 is a flowchart of a first control procedure of the pre-search operation in the high-frequency heating device 400 of the fourth embodiment depicted in FIG. 17. The high-frequency heating device 400 of the fourth embodiment executes the following processes in the control part 410.

First, the control part 410 detects levels of backflow powers at all the frequencies usable for heating for each of the radiation parts when the same frequency is radiated from the radiation parts at the same time (step S411). Specifically, the control part 410 defines frequencies usable for heating as frequencies of subcarrier waves and inputs information of frequencies of the same subcarrier waves to the first modulation signal generating part 450a and the second modulation signal generating part 450b, and the same subcarrier waves are generated in the first high-frequency power unit 430a and the second high-frequency power unit 430b and output to the first radiation part 440a and the second radiation part 440b. In this case, since the backflow power flowing back from the first radiation part 440a to the first high-frequency power unit 430a is detected by the power detection part 490a and the in-phase detection signal Det(I)1 and the quadrature detection signal Det(Q)1 output from the power detection part 490a are demodulated by the first demodulation part 480a, the control part 410 detects frequencies and levels of individual subcarrier waves of the backflow power flowing back from the first radiation part 440a to the first high-frequency power unit 430a by using the frequencies and vector information of the individual subcarrier waves input from the second demodulation part 480b. Concurrently, since the backflow power flowing back from the second radiation part 440b to the second high-frequency power unit 430b is detected by the power detection part 490b and the in-phase detection signal Det(I)2 and the quadrature detection signal Det(Q)2 output from the power detection part 490b are demodulated by the second demodulation part 480b, the control part 410 detects frequencies and levels of individual subcarrier waves of the backflow power flowing back from the second radiation part 440b to the second high-frequency power unit 430b by using the frequencies and vector information of the individual subcarrier waves input from the second demodulation part 480b.

In the following description, the backflow power flowing back from the first radiation part 440a to the first high-frequency power unit 430a and the backflow power flowing back from the second radiation part 440b to the second high-frequency power unit 430b may be referred to as the backflow power of the first radiation part 440a and the backflow power of the second radiation part 440b.

When the same frequency is radiated from the radiation parts at the same time, a method of detecting levels of backflow powers at all the frequencies usable for heating for each of the radiation parts is the same as the method of detecting levels of backflow powers at all the frequencies usable for heating at step S301 of FIG. 15 described in the third embodiment and therefor will not be described.

The control part 410 then detects levels of backflow powers at all the frequencies usable for heating for each of the radiation parts when different frequencies are radiated from the radiation parts at the same time (step S412). Specifically, the control part 410 defines frequencies usable for heating as frequencies of subcarrier waves and inputs information of frequencies of respective different subcarrier waves to the first modulation signal generating part 450a and the second modulation signal generating part 450b, and the subcarrier waves of respective different frequencies are generated in the first high-frequency power unit 430a and the second high-frequency power unit 430b and output to the first radiation part 440a and the second radiation part 440b. In this case, the backflow power of the first radiation part 440a is detected by the power detection part 490a and the in-phase detection signal Det(I)1 and the quadrature detection signal Det(Q)1 output from the power detection part 490a are demodulated by the first demodulation part 480a. The control part 410 detects frequencies and levels of individual subcarrier waves of the backflow power of the first radiation part 440a by using the frequencies and vector information of the individual subcarrier waves input from the second demodulation part 480b. Concurrently, the backflow power of the second radiation part 440b is detected by the power detection part 490b and the in-phase detection signal Det(I)2 and the quadrature detection signal Det(Q)2 output from the power detection part 490b are demodulated by the second demodulation part 480b. The control part 410 detects frequencies and levels of individual subcarrier waves of the backflow power of the second radiation part 440b by using the frequencies and vector information of the individual subcarrier waves input from the second demodulation part 480b.

In the fourth embodiment, when different frequencies are radiated from the radiation parts at the same time, a method of detecting levels of backflow powers at all the frequencies usable for heating for each of the radiation parts may be the following method.

Dividing the frequencies usable for heating into at least two groups, the frequencies included in a first group are first defined as frequencies of subcarrier waves, and the subcarrier waves of the frequencies included in the first group are generated by the first high-frequency power unit 430a and radiated from the first radiation part 440a. Concurrently with this radiation from the first radiation part 440a, the frequencies included in a second group are defined as frequencies of subcarrier waves, and the subcarrier waves of the frequencies included in the second group are generated by the second high-frequency power unit 430b and radiated from the second radiation part 440b. As a result, the backflow power of the first radiation part 440a and the backflow power of the second radiation part 440b are detected.

Subsequently, the frequencies included in the second group are defined as frequencies of subcarrier waves, and the subcarrier waves of the frequencies included in the second group are generated by the first high-frequency power unit 430a and radiated from the first radiation part 440a. Concurrently with this radiation from the first radiation part 440a, the frequencies included in the first group are defined as frequencies of subcarrier waves, and the subcarrier waves of the frequencies included in the second group are generated by the second high-frequency power unit 430b and radiated from the second radiation part 440b. As a result, the backflow power of the first radiation part 440a and the backflow power of the second radiation part 440b are detected.

The above operation is repeated to correlate the frequency groups with the each of the high-frequency power units in order such that all the groups are assigned to all the radiation parts so as to detect the backflow power of the first radiation part 440a and the backflow power of the second radiation part 440b. As a result of the operation described above, the levels of backflow powers can be detected at all the frequencies usable for heating for each of the radiation parts when different frequencies are radiated from the radiation parts at the same time. When different frequencies are radiated from the radiation parts at the same time, a method of detecting levels of backflow powers at all the frequencies usable for heating for each of the radiation parts may be the detection method as described above.

By executing steps S411 and S412 described above, the levels of the backflow powers of the respective radiation parts (the first radiation part 440a and the second radiation part 440b) can be detected when the subcarrier waves of an arbitrary frequency are radiated from one radiation part (e.g., the first radiation part 440a or the second radiation part 440b) and when the subcarrier waves of the same arbitrary frequency are radiated from all the radiation parts (the first radiation part 440a and the second radiation part 440b) at all the frequencies usable for heating.

The control part 410 selects a plurality of combinations of the radiation parts and the frequencies having a small sum of the backflow power levels of all the radiation parts and determines the frequencies used for heating for each of the radiation parts (step S413). Specifically, the control part 410 selects a plurality of combinations of the radiation parts and the frequencies having a small sum of the backflow power levels of all the radiation parts based on the levels of the backflow powers of the respective radiation parts (the first radiation part 440a and the second radiation part 440b) when the subcarrier waves of an arbitrary frequency are radiated from one radiation part (e.g., the first radiation part 440a or the second radiation part 440b) and the levels of the backflow powers of the respective radiation parts (the first radiation part 440a and the second radiation part 440b) when the subcarrier waves of the same arbitrary frequency are radiated from all the radiation parts (the first radiation part 440a and the second radiation part 440b) at all the frequencies usable for heating detected at step S411 and S412, and the control part 410 determines the frequencies of the subcarrier waves used for heating for each of the radiation parts.

In this case, a method of determining the frequencies of the subcarrier waves used for heating for each of the radiation parts may be (1) a method of setting a threshold value of the sum value of backflow power levels of all the radiation parts in advance and determining points of combinations of the radiation parts and the frequencies having a sum value of the detected backflow power level of all the radiation parts smaller than the threshold value as the frequencies of the subcarrier waves used for heating for each of the radiation parts; and (2) a method of determining a plurality of (e.g., three) points of combinations of the radiation parts and the frequencies in ascending order of the sum value of the detected backflow power level of all the radiation parts as the frequencies of the subcarrier waves used for heating for each of the radiation parts.

A second control procedure of the pre-search operation of the fourth embodiment will be described.

Figure 20:
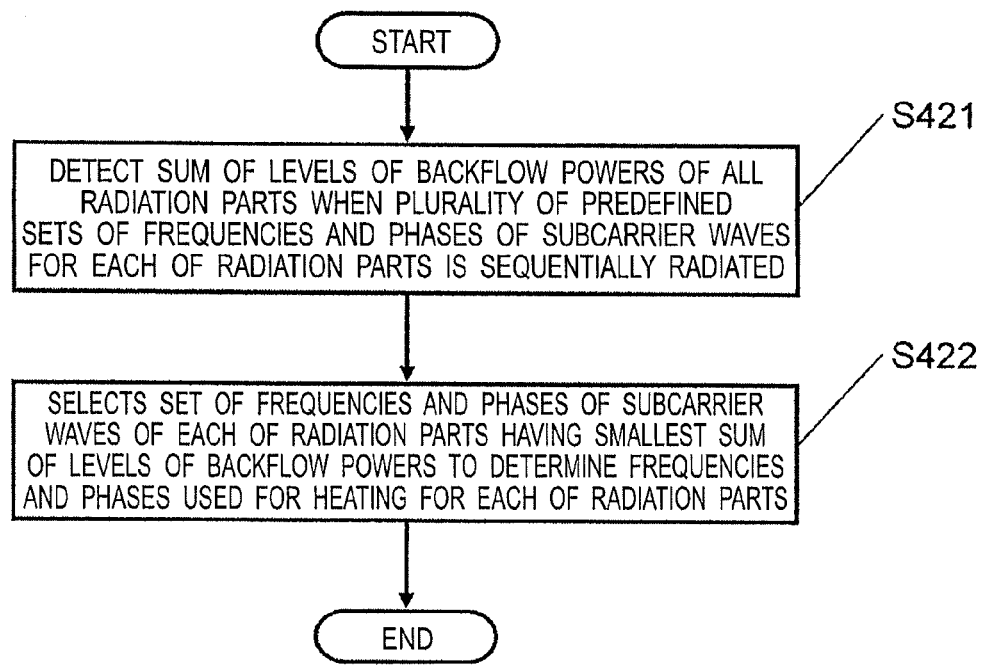
FIG. 20 is a flowchart of a second control procedure of the pre-search operation in the fourth embodiment according to the present invention.

FIG. 20 is a flowchart of the second control procedure of the pre-search operation in the high-frequency heating device 400 of the fourth embodiment depicted in FIG. 17. The high-frequency heating device 400 of FIG. 17 executes the following processes in the control part 410.

First, the control part 410 detects the sum of levels of backflow powers of all the radiation parts when a plurality of predefined sets of frequencies and phases of subcarrier waves for each of the radiation parts is sequentially radiated (step S421). Specifically, the control part 410 inputs to the first modulation signal generating part 450a and the second modulation signal generating part 450b the information of frequencies and phases of individual subcarrier waves corresponding to the respective radiation parts (the first radiation part 440a and the second radiation part 440b) depending on a predefined set of frequencies and phases of a plurality of subcarrier waves used for heating for each of the radiation parts. The first high-frequency power unit 430a and the second high-frequency power unit 430b generate the respective subcarrier waves based on the signals from the first modulation signal generating part 450a and the second modulation signal generating part 450b and output the subcarrier waves to the respective radiation parts (the first radiation part 440a and the second radiation part 440b). The control part 410 detects the levels of the backflow powers of the respective individual subcarrier waves of the respective radiation parts (the first radiation part 440a and the second radiation part 440b) at the time of output of the respective radiation parts (the first radiation part 440a and the second radiation part 440b) into the heating chamber 101. The control part 410 acquires the sum value of the detected levels of the backflow powers of all the subcarrier waves of the respective radiation parts (the first radiation part 440a and the second radiation part 440b). The operation is sequentially performed for a plurality of predefined sets of frequencies and phases of subcarrier waves for each of the radiation parts.

The control part 410 selects a set of frequencies and phases of subcarrier waves of each of the radiation parts having the smallest sum of the levels of the backflow powers to determine the frequencies and phases of the subcarrier waves used for heating for each of the radiation parts (step S422). Specifically, the set having the smallest sum value of the levels of the backflow powers is determined from the sum values of the levels of the backflow powers of the respective sets for a plurality of predefined sets of frequencies and phases of subcarrier waves for each of the radiation parts. The frequencies and phases of the subcarrier waves of each of the radiation parts determined as the set having the smallest sum value of the levels of the backflow powers are used for heating. As described above, the control part 410 determines the frequencies and phases of individual subcarrier waves for each of the radiation parts.

In FIG. 17, the high-frequency heating device 400 of the fourth embodiment is made up of two sets of the high-frequency power units, the radiation parts, the modulation signal generating parts, and the demodulation parts by way of example. The demodulation parts are made up of the first high-frequency power unit 430a, the first radiation part 440a, the first modulation signal generating part 450a, and the first demodulation part 480a as well as the second high-frequency power unit 430b, the second radiation part 440b, the second modulation signal generating part 450b, and the second demodulation part 480b. However, in the present invention, the number of sets of the high-frequency power units, the radiation parts, the modulation signal generating parts, and the demodulation parts is not limited to the configuration of the fourth embodiment and it is only necessary to include a plurality of sets of the high-frequency power units, the radiation parts, the modulation signal generating parts, and the demodulation parts.

According to the configuration of the high-frequency heating device 400 of the fourth embodiment, since the one high-frequency power generating part 120 corresponds to two sets of the first high-frequency power unit 430a/the first radiation part 440a and the second high-frequency power unit 430b/the second radiation part 440b, the high-frequency heating device 400 can radiate a plurality of high-frequency powers of arbitrary frequencies and phases from the respective radiation parts (the first radiation part 440a and the second radiation part 440b) at the same time. The high-frequency heating device 400 can detect a plurality of subcarrier waves radiated from the respective radiation parts (the first radiation part 440a and the second radiation part 440b) to the heating chamber 101 and a plurality of subcarrier waves flowing back from the heating chamber 101 to the respective radiation parts (the first radiation part 440a and the second radiation part 440b), for each of the individual subcarrier waves. As a result, the high-frequency heating device 400 of the fourth embodiment can comprehend efficiency for each of the individual subcarrier waves by performing the pre-search operation before heating so as to select highly efficient frequencies and phases and therefore can provide various types of heating region control with higher efficiency.

Although the present invention has been described in detail to a certain extent in terms of the embodiments, the contents of the disclosure of the embodiments may naturally vary in terms of details of configuration, and the combination and order of the elements in the embodiments may be changed without departing from the scope and the spirit of this disclosure.

Although the high-frequency heating device according to the present invention has been described based on the embodiments, the present invention is not limited to the embodiments. Forms acquired by applying various modifications conceived by those skilled in the art to the embodiments and forms constructed by combining constituent elements of different embodiments fall within the scope or the present invention as long as the forms do not depart from the spirit of the present invention.

INDUSTRIAL APPLICABILITY

In a high-frequency heating device including one high-frequency power generating part and at least one high-frequency power unit, high-frequency powers of pluralities of frequencies and phases can be generated to radiate the plurality of the high-frequency powers from the same radiation part at the same time to an object to be heated and, therefore, the present invention is useful for a cooking appliance such as a microwave oven.

What is claimed is:

1. A high-frequency heating device heating an object to be heated housed in a heating chamber comprising:
at least one high-frequency power generating part generating a high-frequency power of a set frequency;
at least one high-frequency power unit including a quadrature modulation part modulating a high-frequency power generated by the high-frequency power generating part with an input modulation signal, and a high-frequency power amplification part amplifying a high-frequency power modulated by the quadrature modulation part to an amplitude of power suitable for heating;
at least one radiation part radiating a high-frequency power output from the high-frequency power unit to the object to be heated;
a modulation signal generating part generating a modulation signal supplied to the quadrature modulation part based on input information of pluralities of frequencies and phases; and
a control part setting a reference frequency of a high-frequency power radiated from the radiation part in the high-frequency power generating part, the control part outputting information of individual frequencies and phases of a plurality of high-frequency powers radiated from the radiation part to the modulation signal generating part,
the control part supplying the modulation signal generating part with a plurality of pieces of subcarrier information respectively including pieces of information of offset frequencies and phases relative to the reference frequency for a plurality of high-frequency powers radiated from the radiation part,
the modulation signal generating part generating an in-phase modulation signal and a quadrature modulation signal based on the plurality of pieces of subcarrier information supplied from the control part, the modulation signal generating part outputting the in-phase modulation signal and the quadrature modulation signal to the quadrature modulation part,
the quadrature modulation part performing quadrature modulation of a high-frequency power input from the high-frequency power generating part with the in-phase modulation signal and the quadrature modulation signal input from the modulation signal generating part, the quadrature modulation part outputting a plurality of subcarrier waves of the offset frequencies and the phases relative to the reference frequency.

2. The high-frequency heating device of claim 1, wherein the modulation signal generating part generates the in-phase modulation signal and the quadrature modulation signal by an inverse fast Fourier transform arithmetic process for the plurality of pieces of subcarrier information supplied from the control part and supplies the in-phase modulation signal and the quadrature modulation signal to the modulation signal generating part.

3. The high-frequency heating device of claim 2, wherein the control part further has a subcarrier information storage part storing a plurality of predefined pieces of the subcarrier information, takes out a plurality of suitable pieces of the subcarrier information from the subcarrier information storage part when performing the heating, sets the reference frequency in the high-frequency power generating part, and outputs the subcarrier information to the modulation signal generating part.

4. The high-frequency heating device of claim 3, wherein the control part determines the reference frequency such that a maximum value of absolute values of the offset frequencies relative to the reference frequency is minimized in the plurality of the subcarrier waves, and sets the frequency in the high-frequency power generating part.

5. The high-frequency heating device of claim 4, wherein
the high-frequency power unit further includes a power detection unit, wherein
the power detection unit detects an output power sent out from the high-frequency power amplification part to the radiation part and/or a backflow power flowing back from the radiation part to the high-frequency power amplification part, and wherein
the control unit determines the subcarrier information supplied to the modulation signal generating part and the reference frequency set in the high-frequency power generating part by using detection information of the output power and/or the backflow power detected by the power detection unit.

6. The high-frequency heating device of claim 4, wherein
the high-frequency power unit further includes a power detection unit, wherein
the power detection unit detects an output power sent out from the high-frequency power amplification part to the radiation part and/or a backflow power flowing back from the radiation part to the high-frequency power amplification part, wherein
the control unit determines the subcarrier information supplied to the modulation signal generating part and the reference frequency set in the high-frequency power generating part by using detection information of the output power and/or the backflow power detected by the power detection unit, wherein
the power detection part has a quadrature detection part, wherein
the quadrature detection part detects an in-phase detection signal and a quadrature detection signal for demodulating the output power or the backflow power by performing quadrature detection of the output power or the backflow power by using the high-frequency power generated in the high-frequency power generating part, wherein
the control part further has a demodulation part, wherein
the demodulation part acquires offset frequency and phase information of individual subcarriers by applying a fast Fourier transform arithmetic process to the in-phase detection signal and the quadrature detection signal detected by the quadrature detection part to acquire offset frequency and phase information of individual subcarriers, and wherein the control part determines the subcarrier information supplied to the modulation signal generating part and the reference frequency set in the high-frequency power generating part by using the offset frequency and phase information of individual subcarriers acquired by the demodulation part.

7. The high-frequency heating device of claim 3, wherein
the high-frequency power unit further includes a power detection unit, wherein
the power detection unit detects an output power sent out from the high-frequency power amplification part to the radiation part and/or a backflow power flowing back from the radiation part to the high-frequency power amplification part, and wherein the control unit determines the subcarrier information supplied to the modulation signal generating part and the reference frequency set in the high-frequency power generating part by using detection information of the output power and/or the backflow power detected by the power detection unit.

8. The high-frequency heating device of claim 3, wherein the high-frequency power unit further includes a power detection unit, wherein the power detection unit detects an output power sent out from the high-frequency power amplification part to the radiation part and/or a backflow power flowing back from the radiation part to the high-frequency power amplification part, wherein the control unit determines the subcarrier information supplied to the modulation signal generating part and the reference frequency set in the high-frequency power generating part by using detection information of the output power and/or the backflow power detected by the power detection unit, wherein the power detection part has a quadrature detection part, wherein the quadrature detection part detects an in-phase detection signal and a quadrature detection signal for demodulating the output power or the backflow power by performing quadrature detection of the output power or the backflow power by using the high-frequency power generated in the high-frequency power generating part, wherein the control part further has a demodulation part, wherein the demodulation part acquires offset frequency and phase information of individual subcarriers by applying a fast Fourier transform arithmetic process to the in-phase detection signal and the quadrature detection signal detected by the quadrature detection part to acquire offset frequency and phase information of individual subcarriers, and wherein the control part determines the subcarrier information supplied to the modulation signal generating part and the reference frequency set in the high-frequency power generating part by using the offset frequency and phase information of individual subcarriers acquired by the demodulation part.

9. The high-frequency heating device of claim 2, wherein the control part determines the reference frequency such that a maximum value of absolute values of the offset frequencies relative to the reference frequency is minimized in the plurality of the subcarrier waves, and sets the frequency in the high-frequency power generating part.

10. The high-frequency heating device of claim 9, wherein the high-frequency power unit further includes a power detection unit, wherein the power detection unit detects an output power sent out from the high-frequency power amplification part to the radiation part and/or a backflow power flowing back from the radiation part to the high-frequency power amplification part, and wherein the control unit determines the subcarrier information supplied to the modulation signal generating part and the reference frequency set in the high-frequency power generating part by using detection information of the output power and/or the backflow power detected by the power detection unit.

11. The high-frequency heating device of claim 9, wherein the high-frequency power unit further includes a power detection unit, wherein the power detection unit detects an output power sent out from the high-frequency power amplification part to the radiation part and/or a backflow power flowing back from the radiation part to the high-frequency power amplification part, wherein the control unit determines the subcarrier information supplied to the modulation signal generating part and the reference frequency set in the high-frequency power generating part by using detection information of the output power and/or the backflow power detected by the power detection unit, wherein the power detection part has a quadrature detection part, wherein the quadrature detection part detects an in-phase detection signal and a quadrature detection signal for demodulating the output power or the backflow power by performing quadrature detection of the output power or the backflow power by using the high-frequency power generated in the high-frequency power generating part, wherein the control part further has a demodulation part, wherein the demodulation part acquires offset frequency and phase information of individual subcarriers by applying a fast Fourier transform arithmetic process to the in-phase detection signal and the quadrature detection signal detected by the quadrature detection part to acquire offset frequency and phase information of individual subcarriers, and wherein the control part determines the subcarrier information supplied to the modulation signal generating part and the reference frequency set in the high-frequency power generating part by using the offset frequency and phase information of individual subcarriers acquired by the demodulation part.

12. The high-frequency heating device of claim 2, wherein the high-frequency power unit further includes a power detection unit, wherein the power detection unit detects an output power sent out from the high-frequency power amplification part to the radiation part and/or a backflow power flowing back from the radiation part to the high-frequency power amplification part, and wherein the control unit determines the subcarrier information supplied to the modulation signal generating part and the reference frequency set in the high-frequency power generating part by using detection information of the output power and/or the backflow power detected by the power detection unit.

13. The high-frequency heating device of claim 2, wherein the high-frequency power unit further includes a power detection unit, wherein the power detection unit detects an output power sent out from the high-frequency power amplification part to the radiation part and/or a backflow power flowing back from the radiation part to the high-frequency power amplification part, wherein the control unit determines the subcarrier information supplied to the modulation signal generating part and the reference frequency set in the high-frequency power generating part by using detection information of the output power and/or the backflow power detected by the power detection unit, wherein the power detection part has a quadrature detection part, wherein the quadrature detection part detects an in-phase detection signal and a quadrature detection signal for demodulating the output power or the backflow power by performing quadrature detection of the output power or the backflow power by using the high-frequency power generated in the high-frequency power generating part, wherein the control part further has a demodulation part, wherein the demodulation part acquires offset frequency and phase information of individual subcarriers by applying a fast Fourier transform arithmetic process to the in-phase detection signal and the quadrature detection signal detected by the quadrature detection part to acquire offset frequency and phase information of individual subcarriers, and wherein the control part determines the subcarrier information supplied to the modulation signal generating part and the reference frequency set in the high-frequency power generating part by using the offset frequency and phase information of individual subcarriers acquired by the demodulation part.

14. The high-frequency heating device of claim 1, wherein the control part further has a subcarrier information storage part storing a plurality of predefined pieces of the subcarrier information, takes out a plurality of suitable pieces of the subcarrier information from the subcarrier information storage part when performing the heating, sets the reference frequency in the high-frequency power generating part, and outputs the subcarrier information to the modulation signal generating part.

15. The high-frequency heating device of claim 14, wherein the control part determines the reference frequency such that a maximum value of absolute values of the offset frequencies relative to the reference frequency is minimized in the plurality of the subcarrier waves, and sets the frequency in the high-frequency power generating part.

16. The high-frequency heating device of claim 15, wherein the high-frequency power unit further includes a power detection unit, wherein the power detection unit detects an output power sent out from the high-frequency power amplification part to the radiation part and/or a backflow power flowing back from the radiation part to the high-frequency power amplification part, and wherein the control unit determines the subcarrier information supplied to the modulation signal generating part and the reference frequency set in the high-frequency power generating part by using detection information of the output power and/or the backflow power detected by the power detection unit.

17. The high-frequency heating device of claim 15, wherein the high-frequency power unit further includes a power detection unit, wherein the power detection unit detects an output power sent out from the high-frequency power amplification part to the radiation part and/or a backflow power flowing back from the radiation part to the high-frequency power amplification part, wherein the control unit determines the subcarrier information supplied to the modulation signal generating part and the reference frequency set in the high-frequency power generating part by using detection information of the output power and/or the backflow power detected by the power detection unit, wherein the power detection part has a quadrature detection part, wherein the quadrature detection part detects an in-phase detection signal and a quadrature detection signal for demodulating the output power or the backflow power by performing quadrature detection of the output power or the backflow power by using the high-frequency power generated in the high-frequency power generating part, wherein the control part further has a demodulation part, wherein the demodulation part acquires offset frequency and phase information of individual subcarriers by applying a fast Fourier transform arithmetic process to the in-phase detection signal and the quadrature detection signal detected by the quadrature detection part to acquire offset frequency and phase information of individual subcarriers, and wherein the control part determines the subcarrier information supplied to the modulation signal generating part and the reference frequency set in the high-frequency power generating part by using the offset frequency and phase information of individual subcarriers acquired by the demodulation part.

18. The high-frequency heating device of claim 14, wherein the high-frequency power unit further includes a power detection unit, wherein the power detection unit detects an output power sent out from the high-frequency power amplification part to the radiation part and/or a backflow power flowing back from the radiation part to the high-frequency power amplification part, and wherein the control unit determines the subcarrier information supplied to the modulation signal generating part and the reference frequency set in the high-frequency power generating part by using detection information of the output power and/or the backflow power detected by the power detection unit.

19. The high-frequency heating device of claim 14, wherein the high-frequency power unit further includes a power detection unit, wherein the power detection unit detects an output power sent out from the high-frequency power amplification part to the radiation part and/or a backflow power flowing back from the radiation part to the high-frequency power amplification part, wherein the control unit determines the subcarrier information supplied to the modulation signal generating part and the reference frequency set in the high-frequency power generating part by using detection information of the output power and/or the backflow power detected by the power detection unit, wherein the power detection part has a quadrature detection part, wherein the quadrature detection part detects an in-phase detection signal and a quadrature detection signal for demodulating the output power or the backflow power by performing quadrature detection of the output power or the backflow power by using the high-frequency power generated in the high-frequency power generating part, wherein the control part further has a demodulation part, wherein the demodulation part acquires offset frequency and phase information of individual subcarriers by applying a fast Fourier transform arithmetic process to the in-phase detection signal and the quadrature detection signal detected by the quadrature detection part to acquire offset frequency and phase information of individual subcarriers, and wherein the control part determines the subcarrier information supplied to the modulation signal generating part and the reference frequency set in the high-frequency power generating part by using the offset frequency and phase information of individual subcarriers acquired by the demodulation part.

20. The high-frequency heating device of claim 1, wherein the control part determines the reference frequency such that a maximum value of absolute values of the offset frequencies relative to the reference frequency is minimized in the plurality of the subcarrier waves, and sets the frequency in the high-frequency power generating part.

21. The high-frequency heating device of claim 20, wherein
the high-frequency power unit further includes a power detection unit, wherein
the power detection unit detects an output power sent out from the high-frequency power amplification part to the radiation part and/or a backflow power flowing back from the radiation part to the high-frequency power amplification part, and wherein
the control unit determines the subcarrier information supplied to the modulation signal generating part and the reference frequency set in the high-frequency power generating part by using detection information of the output power and/or the backflow power detected by the power detection unit.

22. The high-frequency heating device of claim 20, wherein
the high-frequency power unit further includes a power detection unit, wherein
the power detection unit detects an output power sent out from the high-frequency power amplification part to the radiation part and/or a backflow power flowing back from the radiation part to the high-frequency power amplification part, wherein
the control unit determines the subcarrier information supplied to the modulation signal generating part and the reference frequency set in the high-frequency power generating part by using detection information of the output power and/or the backflow power detected by the power detection unit, wherein
the power detection part has a quadrature detection part, wherein
the quadrature detection part detects an in-phase detection signal and a quadrature detection signal for demodulating the output power or the backflow power by performing quadrature detection of the output power or the backflow power by using the high-frequency power generated in the high-frequency power generating part, wherein
the control part further has a demodulation part, wherein
the demodulation part acquires offset frequency and phase information of individual subcarriers by applying a fast Fourier transform arithmetic process to the in-phase detection signal and the quadrature detection signal detected by the quadrature detection part to acquire offset frequency and phase information of individual subcarriers, and wherein the control part determines the subcarrier information supplied to the modulation signal generating part and the reference frequency set in the high-frequency power generating part by using the offset frequency and phase information of individual subcarriers acquired by the demodulation part.

23. The high-frequency heating device of claim 1, wherein
the high-frequency power unit further includes a power detection unit, wherein
the power detection unit detects an output power sent out from the high-frequency power amplification part to the radiation part and/or a backflow power flowing back from the radiation part to the high-frequency power amplification part, and wherein
the control unit determines the subcarrier information supplied to the modulation signal generating part and the reference frequency set in the high-frequency power generating part by using detection information of the output power and/or the backflow power detected by the power detection unit.

24. The high-frequency heating device of claim 1, wherein
the high-frequency power unit further includes a power detection unit, wherein
the power detection unit detects an output power sent out from the high-frequency power amplification part to the radiation part and/or a backflow power flowing back from the radiation part to the high-frequency power amplification part, wherein
the control unit determines the subcarrier information supplied to the modulation signal generating part and the reference frequency set in the high-frequency power generating part by using detection information of the output power and/or the backflow power detected by the power detection unit, wherein
the power detection part has a quadrature detection part, wherein
the quadrature detection part detects an in-phase detection signal and a quadrature detection signal for demodulating the output power or the backflow power by performing quadrature detection of the output power or the backflow power by using the high-frequency power generated in the high-frequency power generating part, wherein
the control part further has a demodulation part, wherein
the demodulation part acquires offset frequency and phase information of individual subcarriers by applying a fast Fourier transform arithmetic process to the in-phase detection signal and the quadrature detection signal detected by the quadrature detection part to acquire offset frequency and phase information of individual subcarriers, and wherein the control part determines the subcarrier information supplied to the modulation signal generating part and the reference frequency set in the high-frequency power generating part by using the offset frequency and phase information of individual subcarriers acquired by the demodulation part.

* * * * *